(12) United States Patent
Wu et al.

(10) Patent No.: US 9,752,428 B2
(45) Date of Patent: Sep. 5, 2017

(54) METHODS AND APPARATUS TO ACQUIRE COMPENSATED SIGNALS FOR DETERMINATION OF FORMATION PARAMETERS

(71) Applicant: Halliburton Energy Services, Inc., Houston, TX (US)

(72) Inventors: Hsu-Hsiang Wu, Sugar Land, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/431,887

(22) PCT Filed: Dec. 18, 2012

(86) PCT No.: PCT/US2012/070357
§ 371 (c)(1),
(2) Date: Mar. 27, 2015

(87) PCT Pub. No.: WO2014/098806
PCT Pub. Date: Jun. 26, 2014

(65) Prior Publication Data
US 2015/0240629 A1    Aug. 27, 2015

(51) Int. Cl.
*E21B 49/00* (2006.01)
*G01V 3/34* (2006.01)
*E21B 47/12* (2012.01)
*G01V 3/28* (2006.01)
*G01V 3/38* (2006.01)

(52) U.S. Cl.
CPC ............ *E21B 47/122* (2013.01); *E21B 49/00* (2013.01); *G01V 3/28* (2013.01); *G01V 3/34* (2013.01); *G01V 3/38* (2013.01)

(58) Field of Classification Search
CPC ................................. E21B 49/00; G01V 3/34
(Continued)

(56) References Cited

U.S. PATENT DOCUMENTS

| 5,869,968 | A  | 2/1999  | Brooks et al.  |
| 7,659,722 | B2 | 2/2010  | Bittar         |
| 7,755,361 | B2 | 7/2010  | Seydoux et al. |
| 8,085,050 | B2 | 12/2011 | Bittar et al.  |
| 2004/0059515 | A1 | 3/2004 | Kennedy    |

(Continued)

FOREIGN PATENT DOCUMENTS

| AU | 2012397321 B2 | 5/2015 |
| CN | 1209499 A     | 3/1999 |

(Continued)

OTHER PUBLICATIONS

"International Application Serial No. PCT/US2012/070357, International Search Report mailed Sep. 2, 2013", 3 pgs.

(Continued)

*Primary Examiner* — Bryan Bui
(74) *Attorney, Agent, or Firm* — Gilliam IP PLLC

(57) ABSTRACT

Various embodiments include apparatus and methods to operate a measurement process in a borehole that uses a symmetric sensor structure or a sensor structure operable to mimic a symmetric sensor structure to provide structural compensation. Apparatus and methods can include a data processing unit to generate compensated signals based on the measurement signals and to determine formation parameters using the compensated signals. Additional apparatus, systems, and methods are disclosed.

16 Claims, 11 Drawing Sheets

(58) Field of Classification Search
USPC .......................................................... 702/11
See application file for complete search history.

(56) References Cited

U.S. PATENT DOCUMENTS

| | | |
|---|---|---|
| 2007/0265784 A1 | 11/2007 | Bal et al. |
| 2009/0230968 A1 | 9/2009 | Bittar et al. |
| 2010/0007348 A1 | 1/2010 | Fang et al. |
| 2010/0030477 A1* | 2/2010 | Yang ................. G01V 3/30 702/9 |
| 2010/0117655 A1 | 5/2010 | Bittar et al. |
| 2010/0127708 A1 | 5/2010 | Bittar |
| 2012/0199394 A1 | 8/2012 | Bittar et al. |
| 2012/0283951 A1 | 11/2012 | Li et al. |

FOREIGN PATENT DOCUMENTS

| | | |
|---|---|---|
| CN | 101918863 A | 12/2010 |
| EP | 2836861 A1 | 2/2015 |
| EP | 2839316 A1 | 2/2015 |
| WO | WO-2004005850 A2 | 1/2004 |
| WO | WO-2007133661 A2 | 11/2007 |
| WO | WO-2008076130 A1 | 6/2008 |
| WO | WO-2011/091216 A2 | 7/2011 |
| WO | WO-2011129828 A1 | 10/2011 |
| WO | WO-2012/008965 A1 | 1/2012 |
| WO | WO-2012/023926 A1 | 2/2012 |
| WO | WO-2012030327 A1 | 3/2012 |
| WO | WO-2014003701 A1 | 1/2014 |
| WO | WO-2014/098806 A9 | 6/2014 |

OTHER PUBLICATIONS

"International Application Serial No. PCT/US2012/070357, Written Opinion mailed Sep. 2, 2013", 5 pgs.

"Norway Application Serial No. 20141257, Office Action mailed Jan. 7, 2015", 4 pgs.

"Norway Application Serial No. 20141257, Office Action mailed Nov. 12, 2014", 1 pg.

"European Application Serial No. 12890203.8, Extended European Search Report mailed May 27, 2015", 7 pgs.

"International Application Serial No. PCT/US2012/070357, International Preliminary Report on Patentability dated Jun. 23, 2015", 6 pgs.

"Australian Serial No. 2012397321, Notice of Acceptance mailed May 21, 2015", 8 pgs.

"European Application Serial No. 128902038, Response filed Nov. 30, 2015 to Extended European Search Report mailed May 27, 2015", 23 pgs.

"Norway Application Serial No. 20141257, Office Action mailed Oct. 6, 2015", (w/ Partial English Translation), 3 pgs.

"Norway Application Serial No. 20141257, Response filed Jul. 23, 2015 to Office Action mailed Jan. 7, 2015", (w/ English Translation of Amended Claims), 123 pgs.

"Norway Application Serial No. 20141257, Response filed Dec. 23, 2015 to Office Action mailed Oct. 6, 2015", (w/ English Translation of Claims), 47 pgs.

"Chinese Application Serial No. 201280077348.X, Office Action mailed Jul. 21, 2016", (w/ English Translation), 16 pgs.

"European Application Serial No. 12890203.8, Office Action mailed Mar. 16, 2016", 5 pgs.

"European Application Serial No. 12890203.8, Response filed Jun. 15, 2016 to Office Action mailed Mar. 16, 2016", 5 pgs.

"Mexican Application Serial No. MX/a/2015/0006215, Office Action mailed May 23, 2016", (w/ English Summary), 3 pgs.

"Canadian Application Serial No. 2,891,643, Office Action mailed Sep. 6, 2016", 3 pgs.

"Mexican Application Serial No. MX/a/2015/0006215, Response filed Jul. 27, 2016 to Office Action mailed May 23, 2016", (w/ English Translation of Claims), 19 pgs.

* cited by examiner

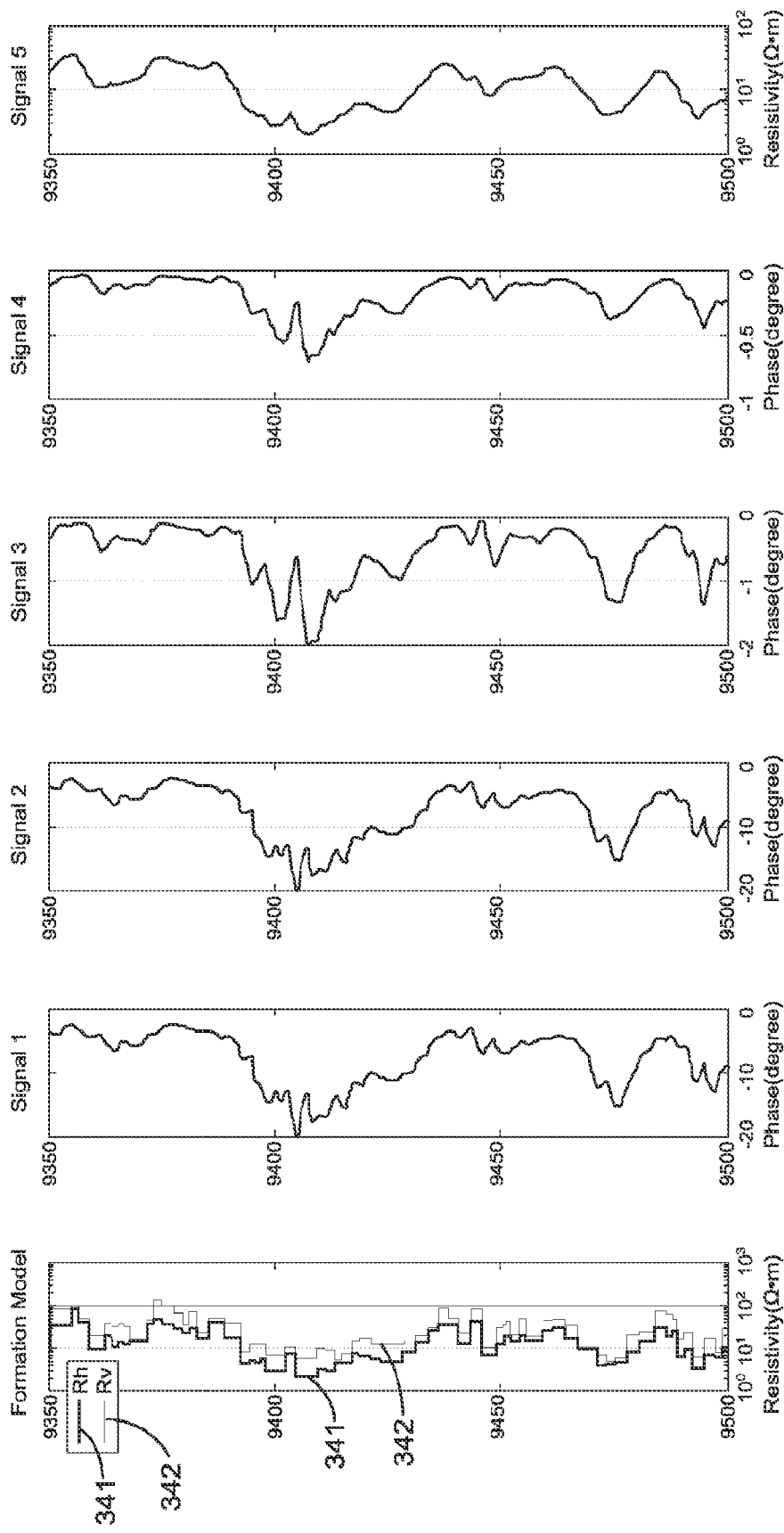

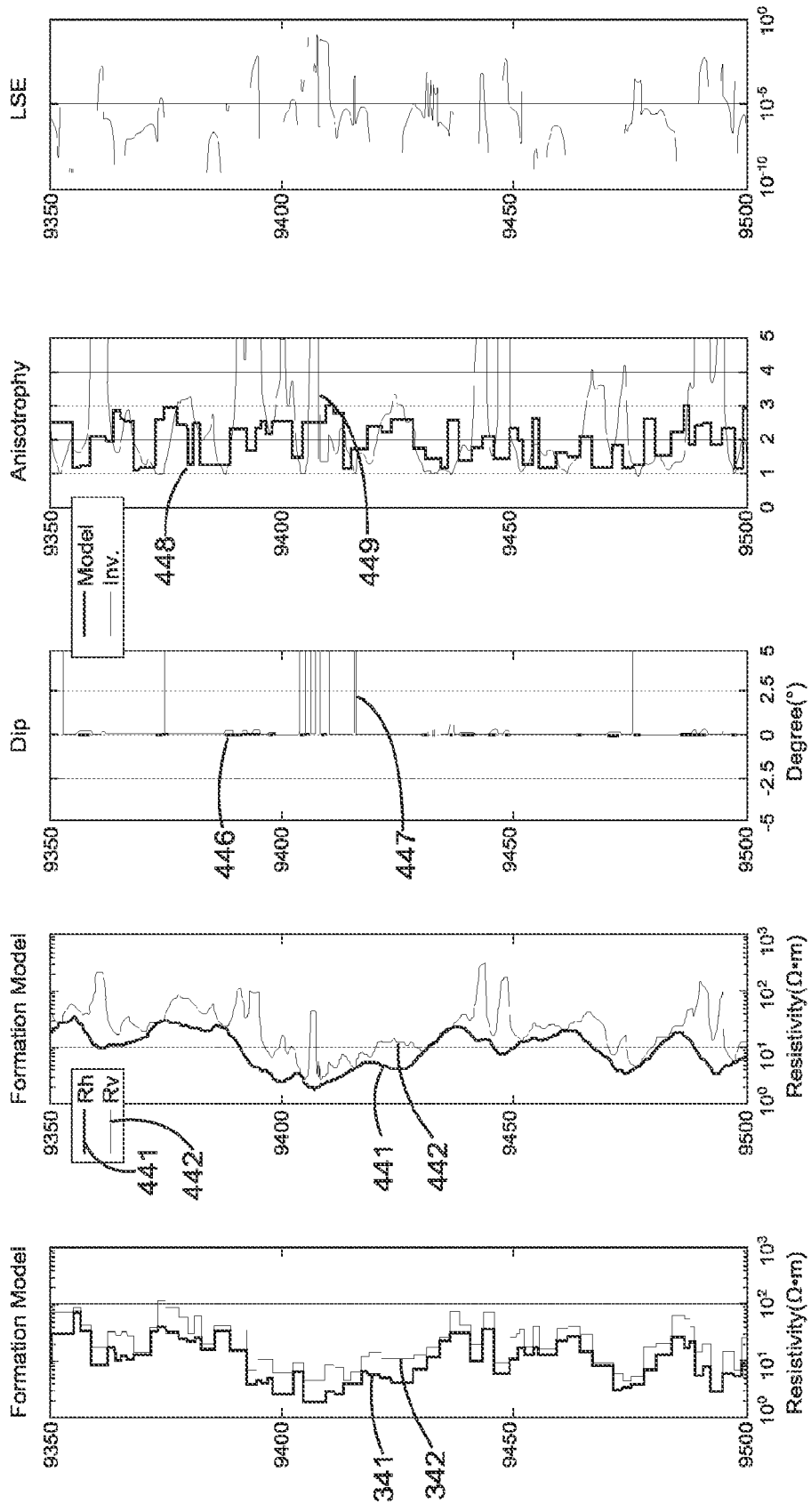

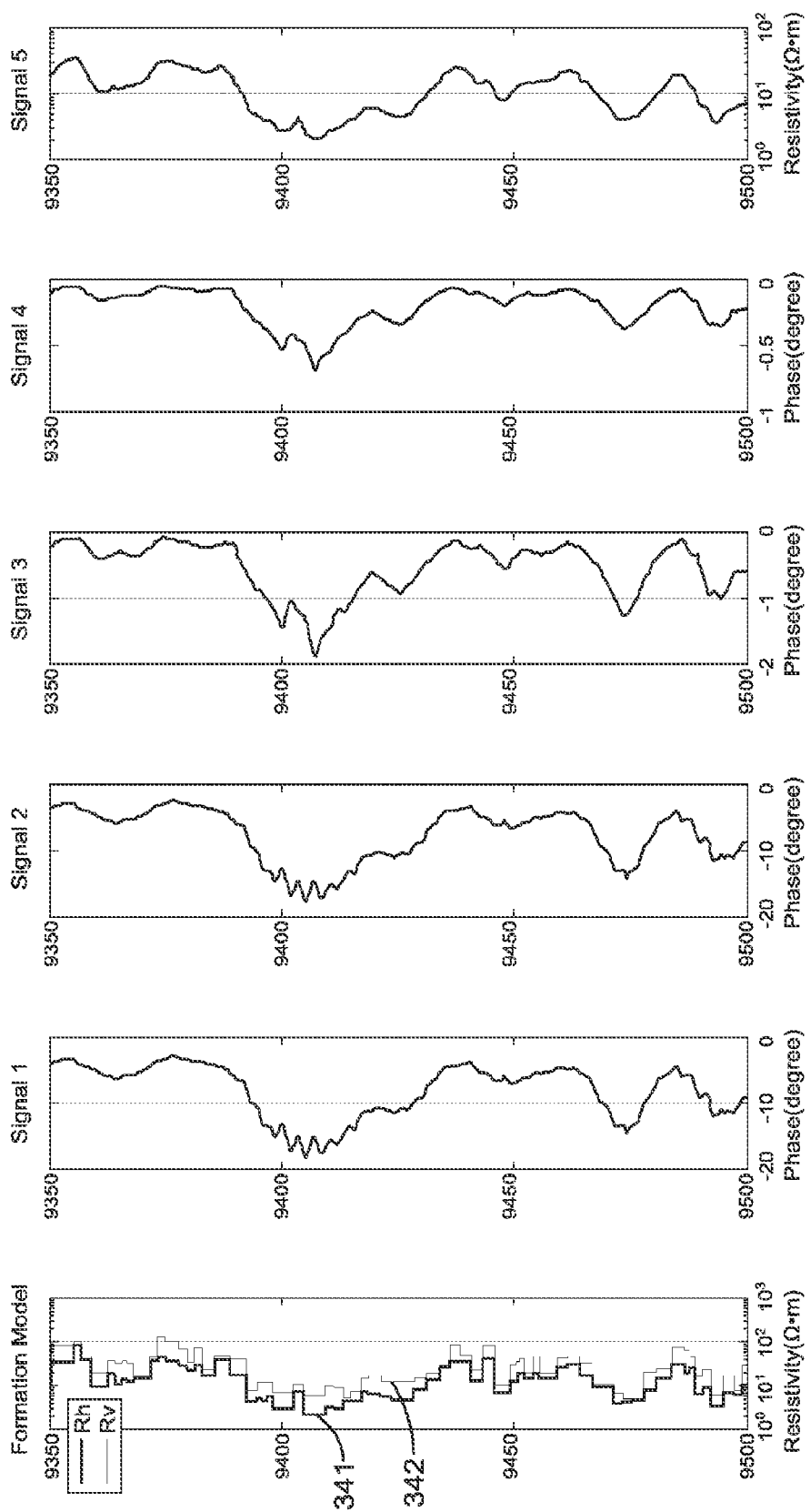

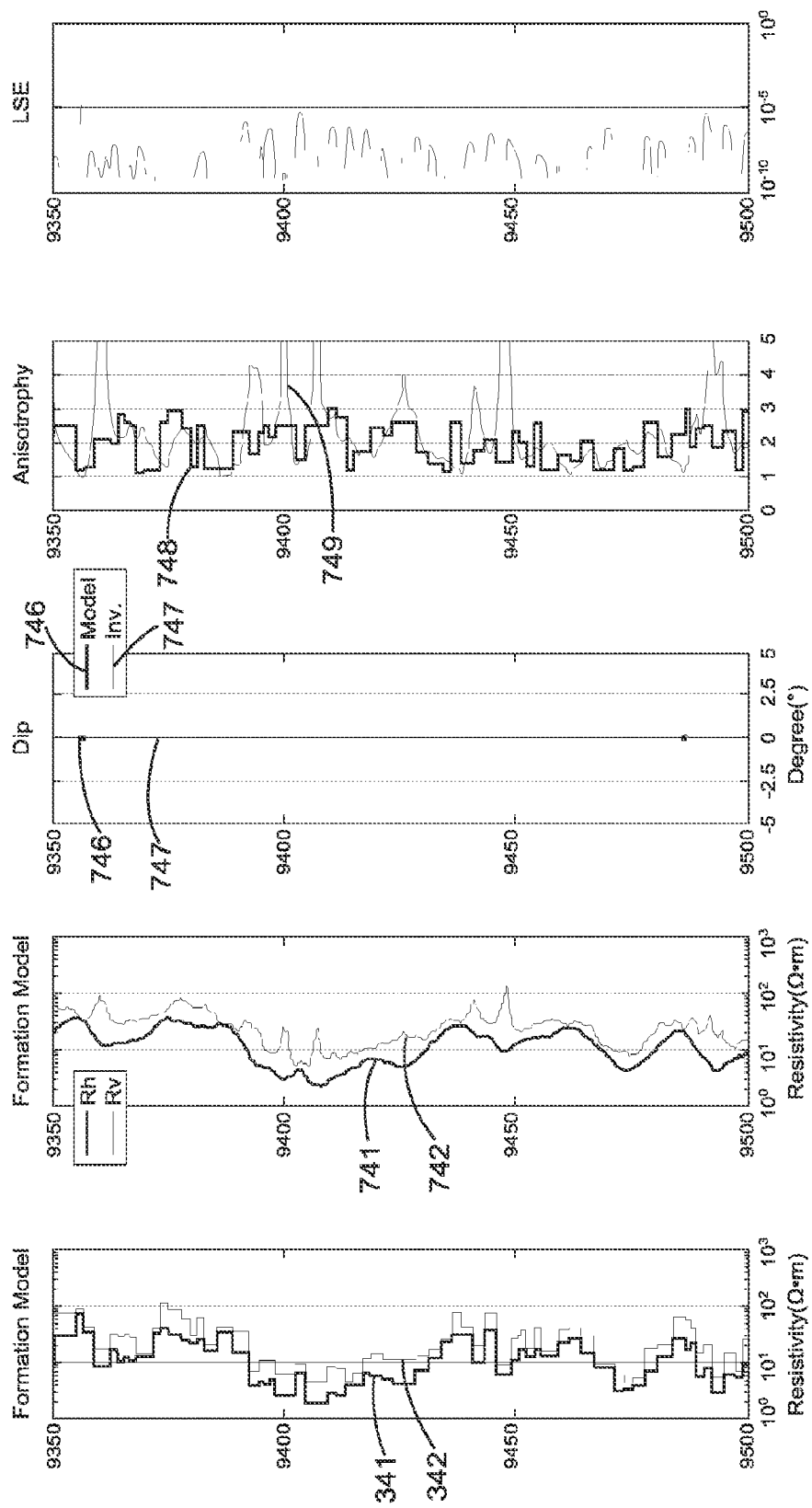

METHODS AND APPARATUS TO ACQUIRE COMPENSATED SIGNALS FOR DETERMINATION OF FORMATION PARAMETERS

PRIORITY APPLICATIONS

This application is a U.S. National Stage Filing under 35 U.S.C. 371 from International Application No. PCT/US2012/070357, filed on 18 Dec. 2012, and published as WO 2014/098806 A1 on 26 Jun. 2014; which application and publication are incorporated herein by reference in their entirety.

TECHNICAL FIELD

The present invention relates generally to apparatus and methods for making measurements related to oil and gas exploration.

BACKGROUND

In drilling wells for oil and gas exploration, understanding the structure and properties of the associated geological formation provides information to aid such exploration. Measurements in a borehole are typically performed to attain this understanding. Induction tools can make accurate resistivity readings of formations downhole and are an important part of well-logging. The reading of these tools is based on the induction principle in which the transmitter produces a magnetic flux, which is picked up by the receiver.

Multi-coupling-component signals of electromagnetic (EM) resistivity logging tools are widely used to explore formation parameters, such as formation anisotropy, relative dip angle, boundaries, etc. Inversion processing of data to determine formation parameters can be performed according to a modeling approach for the formation. Inversion operations can include a comparison of measurements to predictions of a model such that a value or spatial variation of a physical property can be determined. In inversion, measured data may be applied to construct a model that is consistent with the data. For examining, an inversion operation can include determining a variation of electrical conductivity in a formation from measurements of induced electric and magnetic fields. Other techniques, such as a forward model, deal with calculating expected observed values with respect to an assumed model. In zero-dimensional (0D) inversion, there is no variation in the formation, such as in a homogenous formation. In one dimensional (1D) modeling, there is variation in one direction such as a formation of parallel layers. In two dimensional (2D) modeling, there is variation in two directions and, in three dimensional (3D) modeling, there is variation in three directions. In general, a coordinate system in which the above dimensions are defined can be Cartesian or cylindrical. In borehole applications, a cylindrical coordinate system is often used.

In general, zero-dimensional (0D) inversion adopting these coupling components is attractive owing to its simplicity and fast computation. Several processing schemes have been proposed on the basis of 0D inversion using various coupling components to calculate formation parameters. Based on distinct sensitivities of these coupling components, 0D inversion is able to provide accurate inverted formation model at arbitrary wellbore inclinations, especially while the EM tool is located in a thick bed. Processing schemes have provided successful determination of anisotropy parameters, which may include horizontal resistivity, vertical resistivity, relative dip angle, and relative strike, presented by both synthetic responses and field data. A synthetic response is a modeled response of a tool with respect to known parameters of the formation to which the tool is being applied. The synthetic response can be created by numerically modeling the interaction of the tool and the formation, usually involving simulation. In a synthetic log, the simulation may be conducted for each depth of the log on a point by point basis.

In a multi-component electromagnetic logging tool having three orthogonal transmitter coils ($T_X$, $T_Y$, and $T_Z$) and three orthogonal receiver coils ($R_X$, $R_Y$, and $R_Z$), the magnetic field H in the receiver coils can be represented in terms of the magnetic moments M at the transmitters and a coupling matrix C as:

$$H = CM \quad (1)$$

Equation (1) can be expressed as:

$$\begin{bmatrix} H_x \\ H_y \\ H_z \end{bmatrix} = \begin{bmatrix} C_{xx} & C_{xy} & C_{xz} \\ C_{yx} & C_{yy} & C_{yz} \\ C_{zx} & C_{zy} & C_{zz} \end{bmatrix} \begin{bmatrix} M_x \\ M_y \\ M_z \end{bmatrix} \quad (2)$$

where $M_X$, $M_Y$, and $M_Z$ are the magnetic moments of the transmitted signal emitted by transmitters $T_X$, $T_Y$, and $T_Z$, respectively. $H_X$, $H_Y$, and $H_Z$ are the magnetic fields, which are proportional to the received signal at the receiver antennas $R_X$, $R_Y$, and $R_Z$, respectively. Nine absolute or differential measurements can be obtained when each antenna is fired and a signal is measured at each of the three receivers, respectively. Here differential means the complex ratio (or equivalently amplitude ratio or phase difference) between signals from two spatially separated receivers used in the place of one signal from one receiver. These nine measurements enable the determination of a complete coupling matrix C. The components, $C_{IJ}$, can be defined as $C_{IJ} = a_{IJ} V_I^J$, where I is the index of receiver $R_X$, $R_Y$, and $R_Z$, J is the index of transmitter $T_X$, $T_Y$, and $T_Z$, $a_{IJ}$ is a constant coefficient determined by the tool design, and $V_I^J$ is a complex value representing the signal amplitude and phase shift measured by receiver I in response to the firing of transmitter J. The coupling matrix can be used to determine formation properties, for example, using an inversion process. Converting measured signals into cross-coupling components for determination of a complete coupling matrix C has been described.

WO 2011129828 A1 discusses various embodiments that include apparatus and methods of processing and geosteering with respect to well logging. Methods and associated apparatus can include acquiring signals generated from operating a tool rotating in a borehole of a well, where the tool includes a receiver antenna tilted with respect to the longitudinal axis of the tool and two transmitter antennas. The acquired signals can be processed with respect to a direction in the rotation of the tool to determine properties associated with a formation and/or to determine a geosignal for geosteering a drilling operation. WO 2011129828 A1 includes discussion of converting acquired signals to coupling components.

WO 2012030327 discusses various embodiments that include apparatus and methods of operation with respect to well logging. Apparatus and methods include a tool having an arrangement of transmitters and receivers that are operated at different positions downhole and a processing unit to process collected signals such that the arrangement of transmitters and receivers provides measurements that mimic operation of a different arrangement of transmitters and receivers.

WO 2012030327 discusses various embodiments that include apparatus and methods of operation with respect to well logging. Apparatus and methods include a tool having an arrangement of transmitters and receivers that are operated at different positions downhole and a processing unit to process collected signals such that the arrangement of transmitters and receivers provides measurements that mimic operation of a different arrangement of transmitters and receivers.

WO 2008076130 discusses electromagnetic resistivity logging systems and methods that employ an antenna configuration having at most two transmitter or receiver antenna orientations that rotate relative to the borehole. The measurements made by this reduced-complexity antenna configuration enable the determination of at least seven components of a coupling matrix, which may be determined using a linear system of equations that express the azimuthal dependence of the measurements. For increased reliability, averaging may be performed in azimuthally spaced and binned measurements. The coupling matrix components can then be used as the basis for determining logs of various formation parameters, including horizontal resistivity, vertical resistivity, and ratio of vertical resistivity to horizontal resistivity. The ratio of vertical resistivity to horizontal resistivity is a quantitative measure of anisotropy, and it can be replaced by the word anisotropy for simplicity in the discussions that follow.

In a formation model consisting of multiple thin layers, shoulder-bed effects occur and they have different influences on different coupling components. With respect to an induction measurement, a shoulder-bed effect (or a shoulder effect) is the influence on the induction measurement of a layer of interest by the adjacent layer above or below the layer being measured. Such effective coupling components cause inaccuracy in 0D inversion results. For example, at higher drilling wellbore inclination, the ZZ coupling component is affected more by shoulder-bed effects than one of the XX or the YY coupling components. Oppositely at lower drilling dip, such shoulder-bed effects dominate XX and YY coupling components. Consequently, 0D inversion utilizing these coupling components becomes problematic in thin-layer media.

BRIEF DESCRIPTION OF THE DRAWINGS

FIG. 3A shows a representation of a thin-layered formation model, in accordance with various embodiments.

FIGS. 3B-3F show uncompensated synthetic signals of a tool configuration of FIGS. 2A-B, in accordance with various embodiments.

FIG. 4A shows the formation model of FIG. 3A to illustrate inversion results, in accordance with various embodiments.

FIGS. 4B-E show zero dimension inversion results with uncompensated input signals of FIGS. 3B-F, in accordance with various embodiments.

FIG. 6A shows the formation model of FIG. 3A, in accordance with various embodiments.

FIGS. 6B-F show compensated synthetic signals of a tool configuration of FIGS. 4A-D, in accordance with various embodiments.

FIG. 7A shows the formation model of FIG. 3A to illustrate inversion results, in accordance with various embodiments.

FIGS. 7B-E show zero dimension inversion results with compensated input signals of FIGS. 6B-F, in accordance with various embodiments.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
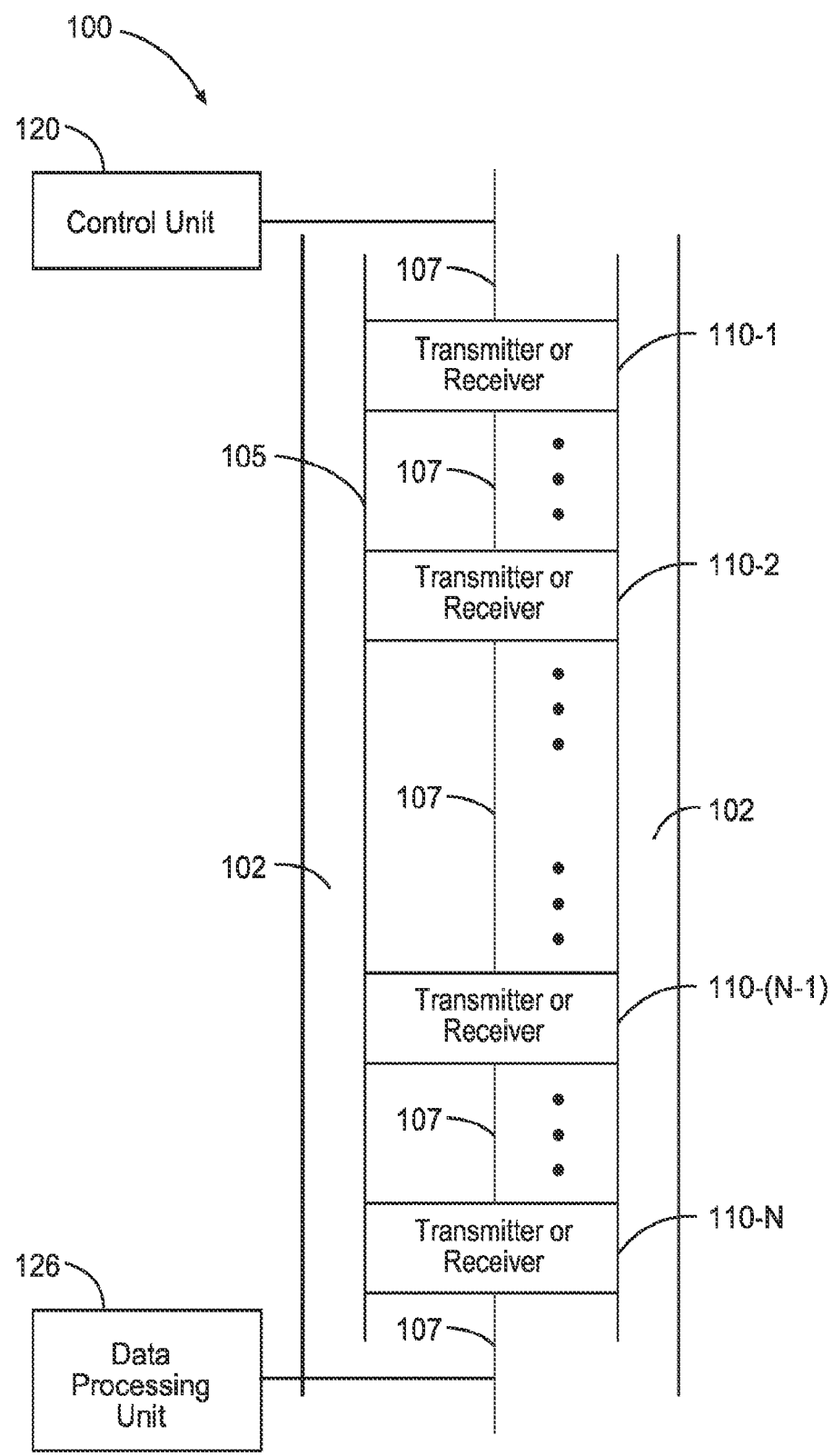
FIG. 1 shows a block diagram of an embodiment of an apparatus 100 having a tool structure 105 operable in a borehole to determine formation properties, in accordance with various embodiments.

FIG. 1 shows a block diagram of an embodiment of an apparatus 100 having a tool structure 105 operable in a borehole to determine formation properties. The tool structure 105 includes an arrangement of sensors 110-1, 110-2 . . . 110-(N-1), 110-N along a longitudinal axis 107 of tool 105. Each sensor 110-1, 110-2 . . . 110-(N-1), 110-N can be tilted with respect to longitudinal axis 107. A tilted sensor is one that is disposed on the tool structure 105 at a selected angle that is greater than tolerance angles associated with a sensor attached placed in parallel or perpendicular to the longitudinal axis 107. Typically, the tilt angle ranges in absolute value from 5° to 85°. The arrangement of sensors can include one or more combinations of transmitting sensors and receiving sensors having tilt angles to form a symmetric sensor tool. Operation of a symmetric sensor tool allows for structural compensation to generate compensation signals that can be processed to determine formation parameters. Sensors 110-1, 110-2 . . . 110-(N-1), 110-N may include one or one or more combinations of transmitting sensors and receiving sensors having tilt angles to form an asymmetric sensor tool. The asymmetric sensor tool can be operated to mimic a symmetric tool to generate compensated signals that can be processed to determine formation parameters. The processing of generated compensated signals may produce accurate readings for anisotropic measurements and accurate evaluation of formations in both wireline applications and measurements-while-drilling (MWD) applications such as logging-while-drilling (LWD) applications.

In various embodiments, arrangements of sensors as taught herein can include the use of a variety of sensors. For example, both transmitting sensors and receiving sensors can be antennas. Sensors can be realized as one of a coil, a solenoid, a magnetometer, or other similar sensor. In case of coil sensors, a tilt angle may be produced by winding the coil with an angle. In case of a solenoid, the elevation angle of the core may be adjusted for the desired tilt angle. In case of a magnetometer, the device may be mounted onto or into the tool with the desired tilt angle.

Apparatus 100 can include a control unit 120 that manages the generation of transmission signals and the collection of received signals corresponding to the transmission signals. The control unit 120 is operable to select specific ones of the sensors 10-1, 110-2 . . . 110-(N-1), 110-N as transmitting sensors and receiving sensors to form a symmetric sensor tool. The control unit 120 can control the firing of selected transmitting sensors and the acquisition of signals from selected receiving sensors such that the measured signals can be used to generate compensated signals related to coupling components as taught herein. The control unit 105 can select specific ones of the sensors 10-1, 110-2 . . . 110-(N-1), 110-N as transmitting sensors and receiving sensors that form an asymmetric sensor tool to mimic a symmetric sensor tool. The control unit 105 can operate such an asymmetric sensor tool such that the measured signals can be used to generate compensated signals related to coupling components as taught herein. The generation of transmission signals can be conducted to provide signals of different frequencies. Each of the different frequencies can be associated with a different transmitting sensor. The collected received signals can be provided to a data processing unit 126 in appropriate format to perform numerical inversion on data generated from signals acquired at receiving sensors in the arrangement of sensors 110-1, 110-2 . . . 110-(N-1), 110-N.

Data processing unit 126 can be structured to process measured signals from a symmetric sensor tool or a mimicked symmetric sensor tool to generate compensation signals. The scheme for generating the compensation signals can be performed in accordance with various embodiments discussed herein. Data processing unit 126 can apply an inversion process to the compensated signals to generate formation parameters. Performing an inversion operation or inversion operations can include using a forward model and/or a library. A forward model provides a set of mathematical relationships for sensor response that can be applied to determining what a selected sensor would measure in a particular environment, which may include a particular formation. A library can include information regarding various formation properties that can be correlated to measured responses to selected probe signals. Performing an inversion operation or inversion operations can include performing an iterative process or performing a pattern matching process. Data processing unit 126 can be arranged as a separate unit from control unit 120 or integrated with control unit 120. Either or both of data processing unit 126 and control unit 120 can be constructed distributed components.

Figure 2A:
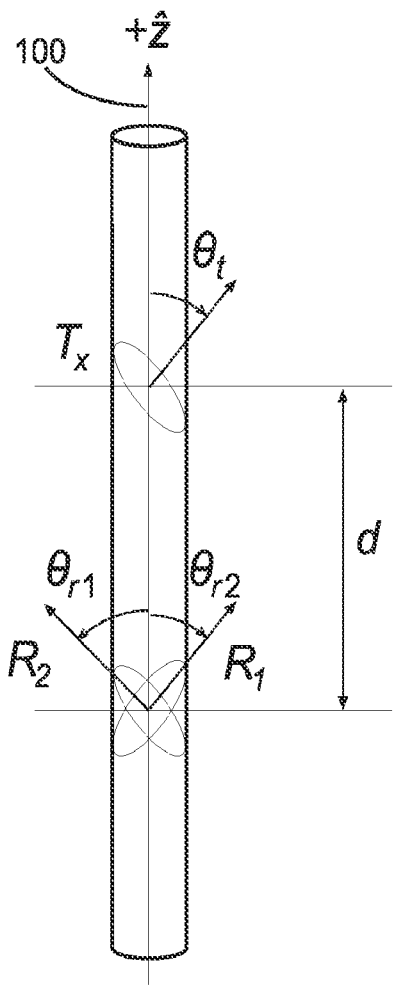
FIGS. 2A-B show antenna configurations with tilted antenna design, in accordance with various embodiments.
Figure 2B:
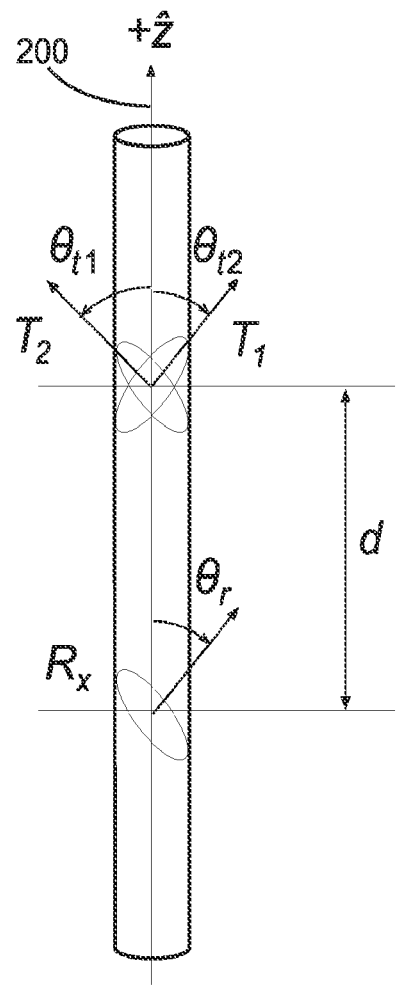

FIGS. 2A-B show antenna configurations with tilted antenna design. This tilted antenna design can be implemented in LWD resistivity logging tools. Theses antenna configurations can be used to obtain coupling components, where nine coupling components can be decoupled afterward. Owing to individual sensitivity of each coupling component, 0D inversion employing these components can produce horizontal resistivity, vertical resistivity, a ratio of vertical to horizontal resistivity, and relative dip angle at arbitrary wellbore inclinations. However, such coupling components typically are uncompensated signals. In a homogeneous formation medium, these uncompensated coupling components can still be successfully used to inspect formation parameters.

However, in formations or formations modeled with multiple thin layers, stronger shoulder-bed effects might occur and cause large artifacts on the coupling components. Without structural compensation, the shoulder-bed effects can make more impact on some of the coupling components than others. Furthermore, such methods using uncompensated signals may have an asymmetrical response with respect to the center of the measuring tool, which can dynamically adjust the measurement focus, depending on formation layer contrast. Consequently, 0D inversion based on all uncompensated coupling components can be unstable, if facing a high-contrast shoulder-bed effect.

In various embodiments, processes can be performed to acquire compensated coupling signals for computing reliable formation parameters in thin-layered media. Such processes can use tilted antennas on top and bottom portions of a measurement tool to produce a compensated signal that is much less affected by shoulder beds. Inverted formation parameters can be compared via 0D inversion based on uncompensated and compensated signals. Using the compensated coupling components, 0D inversion may produce more stable and accurate inverted formation anisotropy parameters and relative dip angles. Furthermore, the stable 0D inverted results can be utilized as optimum initial formation model for advanced one-dimensional (1D) inversion. The schemes and apparatus discussed herein can be applied to two-dimensional (2D) and three-dimensional (3D) inversion processes.

Five signals can be constructed using measurement signals, where the five signals can be very sensitive to formation anisotropy and relative dip angle. Signal 1 can be generated related to a XX coupling component, for example, as a ratio of the XX coupling component. Signal 2 can be generated related to a YY coupling component, for example, as a ratio of the YY coupling component. Signal 3 can be generated related to the ratio between the XX and the YY coupling components. Signal 4 can be generated related to the sum of XZ and ZX coupling components, and signal 5 can be generated related to a resistivity measurement. Other sets of signals can be generated, where the sets can have five signals, more than five signals, or less than five signals, to evaluate formations with sensitivity to formation anisotropy and relative dip angle. FIGS. 1A and 1B show antenna configurations that can be used to collect measured signals to generate the five signals. These configurations with tilted antenna design are operable in logging-while-drilling (LWD) resistivity logging tools.

FIG. 3A shows a representation of a thin-layered formation model with respect to horizontal resistivity, $R_h$, 341, and vertical resistivity, $R_v$, 342, over a depth. FIGS. 3B-3F show the phase part of five uncompensated synthetic signals of a tool configuration of FIGS. 2A-2B corresponding to the formation model of FIG. 3A, with the relative dip angle set as 0°. In general, signals 1-2 have the same sensitivity to shoulder-bed effect, while signals 3-5 have different sensitivity to the shoulder-bed effect.

FIGS. 4B-4E shows 0D inversion results with uncompensated input signals corresponding to the signals of FIGS. 3B-3F with FIG. 4A re-showing the formation model of FIG. 3A to illustrate the inversion results relative to formation. FIG. 4B shows the inverted model for horizontal resistivity, $R_h$, 441, and vertical resistivity, $R_v$, 442 from the signals, while FIG. 4C and FIG. 4D show the inverted results 447 and 449 with respect to the model 446 and 448 for dip and anisotropy, respectively. As indicated in FIG. 4B, the inverted vertical resistivity 442 appears to have a depth shifted behavior when compared to the inverted horizontal resistivity 441. At certain depths with stronger shoulder-bed effects, i.e., high resistivity contrast between layers, such as depth range between 9400 and 9420, the inverted relative dip angle becomes very unstable as well as the inverted formation anisotropy parameters.

FIGS. 5A-5D show symmetric antenna configurations operable for acquisition of compensated signals. These configurations can provide structural compensation. FIG. 6A shows the formation model of FIG. 3A. FIGS. 6B-6F show compensated signals corresponding to the formation model of FIG. 6A using a tool of FIGS. 5A-5D having the same operating frequency and spacing as the tool of FIGS. 2A-2B for the five signals of FIGS. 3B-3F. The five signals shown were generated according to equations (8a-e). The peak responses of five compensated signals of FIGS. 6B-6F behave similarly to the shoulder-bed effect. FIGS. 7B-7E shows 0D inversion results with compensated input signals corresponding to the signals of FIGS. 6B-6F with FIG. 7A re-showing the formation model of FIG. 6A (FIG. 3A) to illustrate the inversion results relative to formation. FIG. 7B shows the inverted model for horizontal resistivity, $R_h$, 741, and vertical resistivity, $R_v$, 742 from the signals, while FIG. 7C and FIG. 7D show the inverted results 747 and 749 with respect to the model 746 and 748 for dip and anisotropy, respectively. The 0D inversion utilizing the compensated signals of FIGS. 6B-6F has more stable and accurate results, shown in FIGS. 7B-7E, than the results in FIGS. 4B-4E, especially for the inverted relative dip angle. The 0D inversion using compensated signals is able to find better matching data (smaller least-square-error, LSE) than using uncompensated signals as illustrated by comparing FIG. 7E with FIG. 7E. Furthermore, these stable 0D inversion results from compensated input signals can be utilized as a good initial formation model for advanced one dimension (1D) inversion.

Figure 5D:
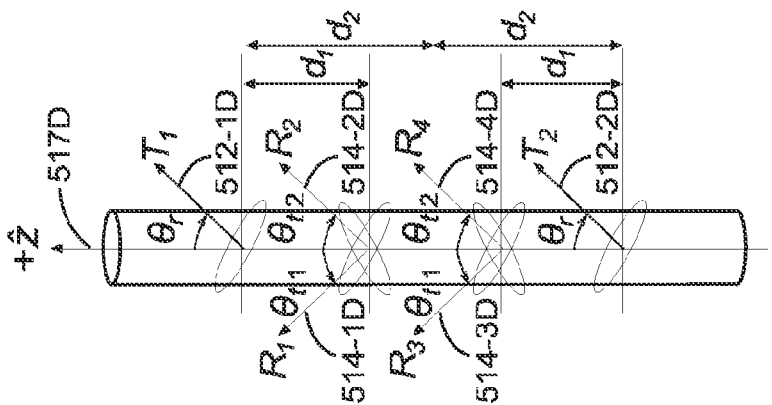
FIGS. 5A-D show symmetric antenna configurations operable for acquisition of compensated signals, in accordance with various embodiments.
Figure 5C:
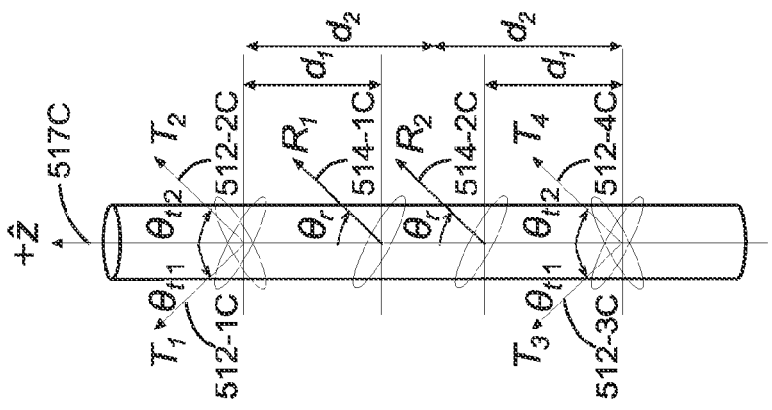

In various embodiments, apparatus and related processing schemes to acquire compensated signals can be realized with symmetric sensor structures. FIG. 5A shows an example tool structure having an upper transmitter 512-1A (T1) and a lower transmitter 512-2A (T2) about a central receiver 514-1A (R) and separated from the central receiver 514-1A by the same distance (d). The upper transmitter 512-1A and the lower transmitter 512-2A can be oriented with respect to the longitudinal axis 517A of the tool structure on which they are disposed to form a symmetric structure, for instance, with $\theta_{t1}=\theta_{t2}$. The upper transmitter 512-1A and the lower transmitter 512-2A, as shown in FIG. 5A, are parallel to each other.

Figure 5B:
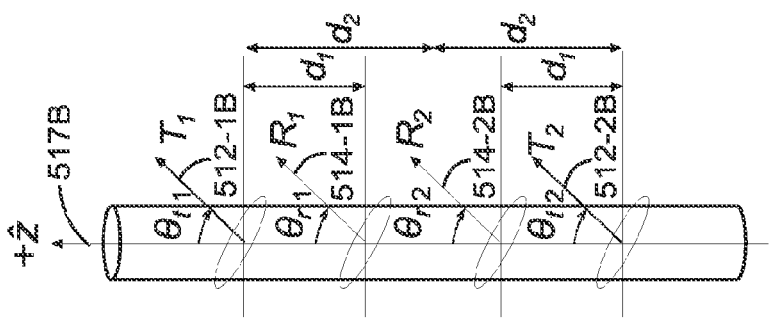
Figure 5A:
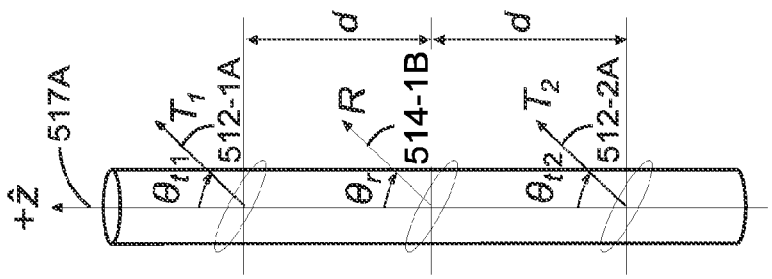

FIG. 5B shows an example tool structure having an upper transmitter 512-1B (T1), a lower transmitter 512-2B (T2), an upper receiver 514-1B (R1), and a lower receiver 514-2B (R2). The upper transmitter 512-1B is separated from the upper receiver 514-1B by distance $d_1$ that is equal to the distance of separation of the lower transmitter 512-2B from the lower receiver 514-2B. The upper transmitter 512-1B is separated from the lower transmitter 512-2B by a distance of $2d_2$. The upper receiver 514-1B is separated from the center point between the upper transmitter 512-1B and the lower transmitter 512-2B by the same distance that the lower receiver 514-2B is separated from this same center point, namely, $d_2-d_1$. The upper transmitter 512-1B and the lower transmitter 512-2B can be oriented with respect to the longitudinal axis 517B of the tool structure on which they are disposed to form a symmetric structure, for instance, with $\theta_{t1}=\theta_{t2}$. With $\theta_{t1}=\theta_{t2}$, the upper transmitter 512-1B and the lower transmitter 512-2B, as shown in FIG. 5B, are parallel to each other. The symmetric structure can also include the upper receiver 514-1B and the lower receiver 514-2B oriented with respect to the longitudinal axis of the tool structure with $\theta_{r1}=\theta_{r2}$. With $\theta_{r1}=\theta_{r2}$, the upper receiver 514-1B and the lower receiver 514-2B, as shown in FIG. 4B, are parallel to each other.

FIG. 5C shows an example tool structure having two upper transmitters 512-1C (T1) and 512-2C (T2), two lower transmitters 512-3C (T3) and 512-4C (T4), an upper receiver 514-1c (R1), and a lower receiver 514-2C (R2). The two upper transmitters 512-1C and 512-2C are co-located along longitudinal axis 517C such that these transmitters are arranged to form an upper crossed antenna structure. The two lower transmitters 512-3C and 512-4C are co-located along longitudinal axis 517C such that these transmitters are arranged to form a lower crossed antenna structure. The upper crossed antenna structure is separated from the upper receiver 514-1C by distance $d_1$ that is equal to the distance of separation of the lower crossed antenna structure from the lower receiver 514-2C. The upper crossed antenna structure is separated from the lower crossed antenna structure by a distance of $2d_2$. The upper receiver 514-1C is separated from the center point between the upper crossed antenna structure and the lower crossed antenna structure by the same distance that the lower receiver 514-2C is separated from this same center point, namely, $d_2-d_1$. The two upper transmitters 512-1C and 512-2C can be oriented with respect to the longitudinal axis 517C of the tool structure such that $\theta_{t1}=-\theta_{t2}$. Lower transmitter 512-3C can be tilted from the longitudinal axis 517C by the same angle that upper transmitters 512-1C is tilted from the longitudinal axis 517C and lower transmitter 512-4C can be tilted from the longitudinal axis 517C by the same angle that upper transmitters 512-2C is tilted from the longitudinal axis 517C. The symmetric structure can also include the upper receiver 514-1C and the lower receiver 514-2C oriented with the same angle, $\theta_r$, with respect to the longitudinal axis 517C of the tool structure. The upper receiver 514-1C and the lower receiver 514-2C, as shown in FIG. 5C, are parallel to each other.

FIG. 5D shows an example tool structure having an upper transmitter 512-1D (T1), a lower transmitter 512-2D (T2), two upper receivers 514-1D (R1) and 514-2D (R2), and two lower receivers 514-3D (R3) and 514-4D (R4). The two upper receivers 514-1D and 514-2D are co-located along longitudinal axis 517D such that these receivers are arranged to form an upper crossed receiver antenna structure. The two lower receivers 512-3D and 512-4D are co-located along longitudinal axis 417D such that these receivers are arranged to form a lower crossed receiver antenna structure. The upper transmitter 512-1D is separated from the upper crossed receiver antenna structure by distance $d_1$ that is equal to the distance of separation of the lower crossed receiver antenna structure from the lower transmitter 512-2D. The upper transmitter 512-1D is separated from the lower transmitter 512-2D a distance of $2d_2$. The upper crossed receiver antenna structure is separated from the center point between the upper transmitter 512-1D and the lower transmitter 512-2D by the same distance that the lower crossed receiver antenna structure is separated from this same center point, namely, $d_2-d_1$. Lower receiver 514-3D can be tilted from the longitudinal axis 517C by the same angle that upper receiver 514-1D is tilted from the longitudinal axis 517C and lower receiver 514-4D can be tilted from the longitudinal axis 517C by the same angle that upper receiver 514-2D is tilted from the longitudinal axis 517C. The symmetric structure can also include the upper transmitter 512-1D and the lower transmitter 512-2D can be oriented with respect to the longitudinal axis 517D of the tool structure by the same angle. The upper transmitter 512-1D and the lower transmitter 512-2D, as shown in FIG. 5D, are parallel to each other.

With the symmetric antenna structures shown in FIGS. 5A-5D, compensation can be directly available. For example, consider FIG. 5A. The upper transmitter 512-1A and the lower transmitter 512-2A have the same distance (d) to the central receiver 514-1A. Herein, a measurement or a measurement signal received at a receiver from generating a signal from a transmitter (firing of a transmitter) can be referenced as $V_{T-R}$. A measurement (labeled $V_{T1-R}$) received at the receiver 514-1A associated with the firing of the transmitter 512-1A, can be compensated with a measurement (labeled $V_{T2-R}$) at receiver 514-1A associated with firing of the transmitter 512-2A. The compensation can be generated as:

$$\text{Signal}^{Comp} = \sqrt{V_{T1-R} \times V_{T2-R}} \qquad (3)$$

Sets of measurements can be made with the tool rotated such that measurements are taken at a number of locations in a rotation of the tool, where the rotation is partitioned into a number or bins. In an embodiment, there will be only two measurements received at each bin to obtain azimuthal compensated signal, according to equation (1) at that bin. Furthermore, all azimuthal compensated signals can be obtained owing to tool's rotating operation. Alternatively, an even number of measurements greater than two can be taken for each bin in which an average of the measurement signals can be used or an average of compensated signals can be generated. These operations with respect to bins can be performed with respect to each sensor arrangement discussed herein.

FIG. 5B introduces and additional receiver to the structure of FIG. 5A. This additional receiver is arranged on the tool structure such that the tool structure continues to be a symmetric structure. A compensation equation can be expressed as $$\text{Signal}^{Comp} = \text{SQRT}(V_{T1-R1} \times V_{T1-R2} \times V_{T2-R1} \times V_{T2-R2}), \qquad (4)$$

where SQRT ( ) is the square root of the quantity in the brackets ( ) For a compensated resistivity measurement, a compensation equation can be expressed as $$\text{Signal}^{Comp} = \text{SQRT}((V_{T1-R2}/V_{T1-R1}) \times (V_{T2-R1}/V_{T2-R2})). \qquad (5)$$

However, the tool configurations of FIGS. 5A and 5B do not decouple all coupling components. Accordingly, the antenna structure of crossed transmitters and the antenna structure of crossed receivers in FIG. 5C and FIG. 5D, respectively, can be used to compute all coupling components. The complete set of coupling components can be used to enable better determination of formation parameters at any relative dip angle.

For example, consider the tool of FIG. 5D. As shown in FIG. 5D, the tool includes the upper transmitter 512-1D that can be fired to generate two sets of all coupling components that can be decoupled. These two sets can be related to spacing $d_1$ and $d_2$. Signals are collected at receivers 514-1D and 514-2D from firing upper transmitter 512-1D associated with $d_1$. Signals are collected at the receivers 514-3D and 514-4D from firing the upper transmitter 512-1D associated with distance $2d_2-d_1$. Known techniques can be used to derive coupling components from received signal measurements. The two sets of signals can be averaged as one set of coupling components, $V_{T1-R1R2R3R4}^{ij}$, where i and j indicate different coupling components. The lower transmitter upper transmitter 512-2D can be fired to generate two sets of all coupling components that can be decoupled, related to spacing $d_1$ and $d_2$, due to the symmetric arrangement of transmitter antennas and receiver antennas of the tool. Signals are collected at receivers 514-3D and 514-4D from firing lower transmitter 512-2D associated with d1. Signals are collected at receivers 514-1D and 514-2D from firing lower transmitter 512-2D associated with distance $2d_2-d_1$. Known techniques can be used to derive coupling components from received signal measurements. Similarly, another set of coupling components, $V_{T2-R1R2R3R4}^{ij}$, associated with the firing of the lower transmitter 512-2D can be decoupled by the measurements received at all receivers corresponding to the firing of the transmitter T2. For each ij, a related compensation can be generated as:

$$\text{Signal}_{ij}^{Comp} = \sqrt{V_{T1-R1R2R3R4}^{ij} \times V_{T2-R1R2R3R4}^{ij}}, \qquad (6)$$

where i and j indicate different coupling components that can be in the $\hat{x}$, $\hat{y}$, $\hat{z}$ direction.

In addition, signals related to the coupling components that are sensitive to formation anisotropy and relative dip angle, such as the five signals discussed above, can be also compensated. For example, the tool structure in FIG. 5D acquires measurement signals from which five signals, $\text{Signal}_i^{T1}$, i=1, 2, 3, 4, or 5, related to the firing of the upper transmitter 512-1D are constructed. Similarly, another five signals, $\text{Signal}_i^{T2}$, i=1, 2, 3, 4, or 5, associated with the lower transmitter T2 can be computed from measurement signals obtained from the firing of the lower transmitter 512-2D. Then a compensation, $\text{Signal}_i^{Comp}$, for each i can be generated as:

$$\text{Signal}_i^{Comp} = \sqrt{\text{Signal}_i^{T1} \times \text{Signal}_i^{T2}}; \; i=1, 2, 3, 4, \text{ or } 5 \qquad (7)$$

For each i, $\text{Signal}_i^{T1}$ and $\text{Signal}_i^{T2}$ can be generated according to the same relationship, where the data for $\text{Signal}_i^{T1}$ is generated from firing upper transistor 512-1D and the data for $\text{Signal}_i^{T2}$ is generated from firing lower transistor 512-2D:

$$\text{Signal}_1^T = V^{zz}(d_1)/V^{zz}(d_2), T=T_1, T_2 \text{ measurements} \qquad (8a)$$

$$\text{Signal}_2^T = \text{SQRT}(V^{xx}(d_1)/V^{zz}(d_1) \times V^{xx}(d_2)/V^{zz}(d_2)), \\ T=T_1, T_2 \text{ measurements} \qquad (8b)$$

$$\text{Signal}_3^T = \text{SQRT}(V^{yy}(d_1)/V^{zz}(d_1) \times V^{yy}(d_2)/V^{zz}(d_2)), \\ T=T_1, T_2 \text{ measurements} \qquad (8c)$$

$$\text{Signal}_4^T = \text{SQRT}(V^{xx}(d_1)/V^{yy}(d_1) \times V^{xx}(d_2)/V^{yy}(d_2)), \\ T=T_1, T_2 \text{ measurements} \qquad (8d)$$

$$\text{Signal}_5^T = \text{SQRT}((1+[(V^{xx}(d_1)+V^{yy}(d_1))/(\tfrac{1}{2}V^{xx}(d_1)+ \\ \tfrac{1}{2}V^{yy}(d_1)+V^{zz}(d_1))]) \times (1+[(V^{xx}(d_2)+V^{yy}(d_2))/ \\ (\tfrac{1}{2}V^{xx}(d_2)+\tfrac{1}{2}V^{yy}(d_2)+V^{zz}(d_2))])), T=T_1, T_2 \text{ measurements}. \qquad (8e)$$

Other signals can be generated for each transmitter $T_1$ and $T_2$, such as the sum $V^{XZ}+V^{ZX}$ and the sum $V^{YZ}+V^{ZY}$. A compensated signal can be generated for these sums with respect to the transmitters $T_1$ and $T_2$. Owing to reciprocity theorem, FIG. 5C describes another tool configuration having the same capabilities as FIG. 5D, and the corresponding compensation equations are those above discussed with respect to FIG. 5D, but replacing the index $T_1$ and $T_2$ with $R_1$ and R2, respectively.

Figure 8:
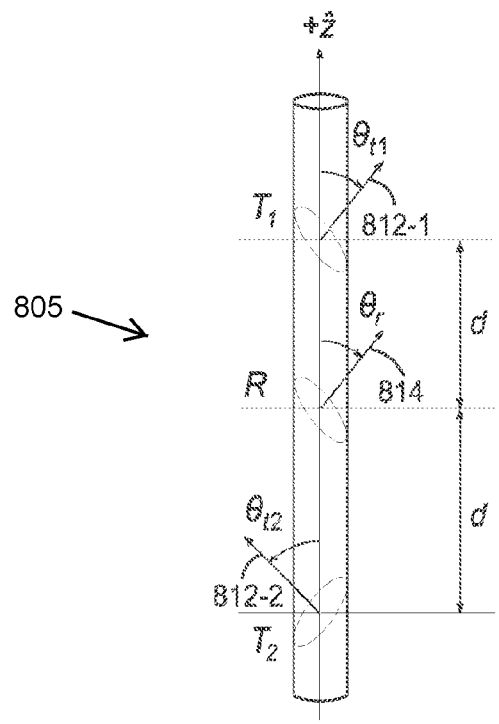
FIG. 8 shows an example of an asymmetric antenna configuration operable in the acquisition of compensated signals, in accordance with various embodiments.
Figure 9:
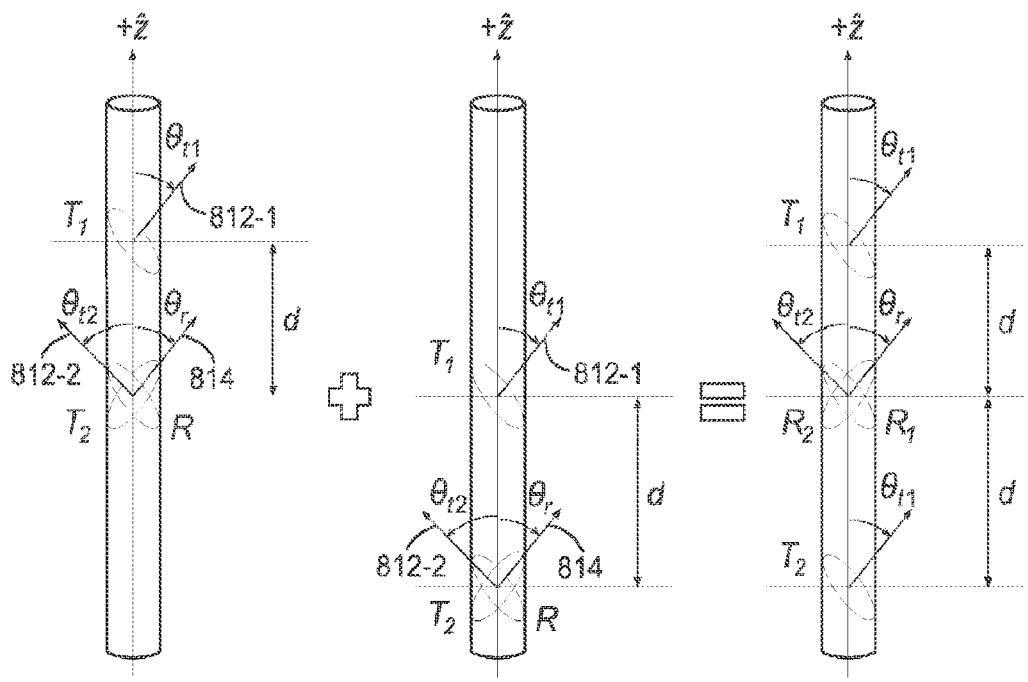
FIG. 9 shows a representation of a scheme to depth shift the asymmetric antenna configuration of FIG. 8 to acquire symmetric antenna structure, in accordance with various embodiments.

Compensated signals can be generated using symmetric data using an asymmetric sensor structure. The symmetric data can be generated by a technique of operating the asymmetric sensor. FIG. 8 shows an example of an asymmetric antenna configuration operable in the acquisition of compensated signals. A processing scheme of depth shifting used on tool 805 can be used before constructing all compensations as discussed above. First, measurements received at central receiver 814 (R) associated with the firing of both transmitter 812-1 (T1) and transmitter 812-2 (T2) at a depth range of 2d are acquired. Then, a curve fitting function is applied to the measurements to interpolate any measurements with a defined depth. Any type of interpolation, such as linear, can be used. Then, a depth shift method can be applied to tool 805 to acquire the desired measurements to obtain symmetric structure as shown in FIG. 9. The shifting method uses reciprocity between receiving and transmitting antennas to operate each antenna to fire and collect signals at positions corresponding to a symmetric configuration such as the resultant configuration shown in FIG. 9. A pseudo structural compensation can then be applied to the measurements of the tool 805 having an asymmetric antenna configuration, based on the equivalent symmetric antenna structure generated by the shifting method. Related processing compensation schemes discussed above can be applied based on the data of the equivalent symmetric configuration from the shifting process.

In making measurements the roles of transmitter and receiver can be switched in all of the configurations discussed herein. The tools discussed can be realized in both LWD and wireline type of tools. The compensated signals generated from using symmetric tools, asymmetric tools operated to mimic a symmetric tool, or combinations thereof can be provided to a data processing unit that conducts inversion processes. Inversions, based on the compensated signals, can be conducted using known inversion techniques. The results of the inversions can provide information on formation parameters such as, but not limited to, such as horizontal resistivity, vertical resistivity, ratio of vertical resistivity to horizontal resistivity, relative dip angle, and relative strike angle.

In traditional logging tools for measuring resistivity anisotropy, uncompensated coupling components are used to determine formation parameters. As a result, instabilities in the inversion results for the 0D inversion have been observed, which have mainly been addressed tackled by employing 1D inversion. However, 1D inversion can be complicated, can lead to reduced vertical resolution, can be time consuming and, in some cases, unreliable. Symmetric sensor structures and processes associated with the symmetric sensor structures, as taught herein, may significantly reduce shoulder-bed effects and produce stable results that are less affected by shoulder beds than may be obtained using traditional logging tools. As taught herein, symmetric sensor structures can include collated sensors to achieve compensation. However, as taught herein, electrically and mechanically simplified tools can be used to achieve compensation without having collocated antennas by employing shifting techniques such that data from the electrically and mechanically simplified tools is essentially equivalent to the data from symmetric tools with collocated antennas. In various embodiments, tool structures and techniques of operating the tool structures may provide anisotropy parameters in a non-horizontal drilling condition, which are not currently available in traditional LWD resistivity logging tools. In addition, these tool structures and techniques of operating theses tool structures, as taught herein, may produce high quality resistivity anisotropy measurements with the least number of antenna components.

Figure 10:
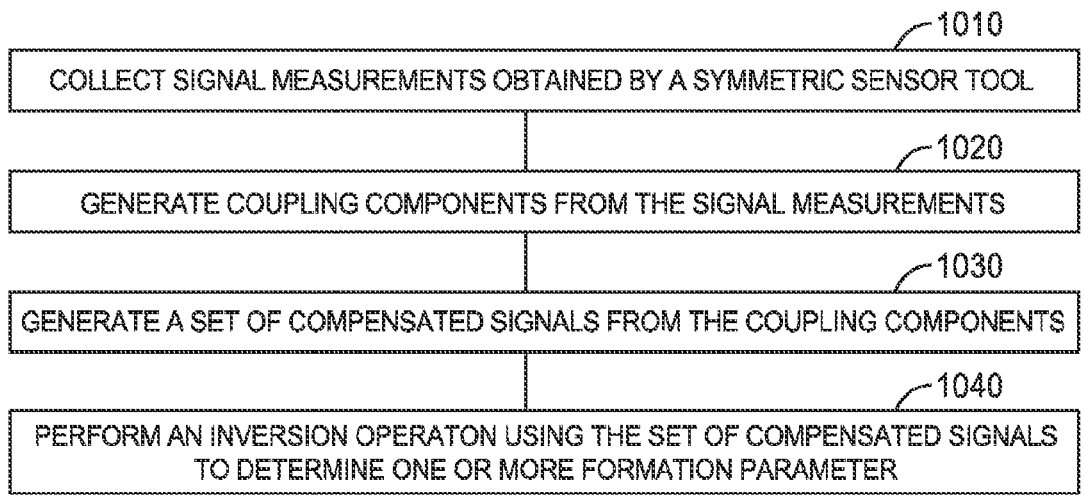
FIG. 10 shows features of an example method of determining formation parameters using compensated signals, in accordance with various embodiments.

FIG. 10 shows features of an example embodiment of a method of determining formation parameters using compensated signals. At 1010, signal measurements obtained by a symmetric sensor tool are collected. These measurement signals may provide decoupling of ZZ, XZ, ZX, and XX coupling components of a relationship between transmitted signals and received signals relative to a formation. The symmetric sensor tool can include a tool structure on which an upper crossed sensor structure, a lower crossed sensor structure, an upper tilted sensor, and a lower tilted sensor are disposed in a symmetric arrangement with respect to a longitudinal axis of the tool structure such that the upper crossed sensor structure and the upper tilted sensor are spaced apart by a distance at which the lower crossed sensor structure and the lower tilted sensor are spaced apart, the upper crossed sensor structure formed by two co-located tilted sensors and the lower crossed sensor structure formed by two co-located tilted sensors. The upper tilted sensor and the lower tilted sensor can be realized as tilted antenna transmitters and the upper crossed sensor structure and the lower crossed sensor structure can be realized as tilted receiver antennas with the upper crossed sensor structure and the lower crossed sensor structure disposed between the upper tilted sensor and the lower tilted sensor. Collecting signal measurements can include firing the upper tilted sensor and collecting signals at each of the tilted antenna receivers of the upper crossed sensor structure in response to firing the upper tilted sensor and the lower crossed sensor structure, and firing the lower tilted sensor and collecting signals at each of the tilted antenna receivers of the upper crossed sensor structure and the lower crossed sensor structure in response to firing the upper tilted sensor and the lower crossed sensor structure. The symmetric tool structure may include the upper tilted sensor and the lower tilted sensor realized as tilted antenna receivers and the upper crossed sensor structure and the lower crossed sensor structure realized as tilted transmitter antennas with the upper tilted sensor and the lower tilted sensor disposed between the upper crossed sensor structure and the lower crossed sensor structure.

At 1020, the coupling components are generated from the signal measurements. At 1030, a set of compensated signals are generated from the coupling components. With upper crossed sensor structure and lower crossed sensor structure disposed between upper tilted sensor and lower tilted sensor, generating the set of compensated signals can include generating $$\text{Signal}_{ij}^{Comp} = \sqrt{V_{T1-R1R2R3R4}^{ij} \times V_{T2-R1R2R3R4}^{ij}}, \quad (9)$$

where i and j indicate different coupling components, $V_{T1-R1R2R3R4}^{ij}$ is a coupling component derived from receiving a signal in each of antenna receivers $R_1$, $R_2$, $R_3$, $R_4$ in response to firing antenna transmitter $T_1$, and $V_{T2-R1R2R3R4}^{ij}$ is a coupling component derived from receiving a signal in each of antenna receivers $R_1$, $R_2$, $R_3$, $R_4$ in response to firing antenna transmitter $T_2$, antenna transmitter $T_1$ being the upper tilted sensor, antenna transmitter $T_2$ being the lower tilted sensor, $R_1$ and $R_2$ forming the upper crossed sensor structure, $R_3$ and $R_4$ forming the lower crossed sensor structure.

Generating the set of compensated signals from the coupling components can include generating compensated signals as $$\text{Signal}_i^{Comp} = \sqrt{\text{Signal}_i^{Tup} \times \text{Signal}_i^{Tdn}}; i=1, 2, 3, 4, \text{ or } 5, \quad (10)$$

with $T_{up}$ being the upper tilted sensor and $\text{Signal}_i^{Tup}$ based on coupling components generated with respect to firing the upper tilted sensor, and $T_{dn}$ being the lower tilted sensor and $\text{Signal}_i^{Tdn}$ based on coupling components generated with respect to firing the lower tilted sensor. Generating $\text{Signal}_i^{Tup}$ and $\text{Signal}_i^{Tdn}$ can include generating, for $T_{up}$ and $T_{dn}$, one or more of $$\text{Signal}_1^T = V^{zz}(d_1)/V^{zz}(d_2), T=T_{up}, T_{dn} \quad (11a)$$

$$\text{Signal}_2^T = \text{SQRT}(V^{xx}(d_1)/V^{zz}(d_1) \times V^{xx}(d_2)/V^{zz}(d_2)), T=T_{up}, T_{dn} \quad (11b)$$

$$\text{Signal}_3^T = \text{SQRT}(V^{yy}(d_1)/V^{zz}(d_1) \times V^{yy}(d_2)/V^{zz}(d_2)), T=T_{up}, T_{dn} \quad (11c)$$

$$\text{Signal}_4^T = \text{SQRT}(V^{xx}(d_1)/V^{yy}(d_1) \times V^{xx}(d_2)/V^{yy}(d_2)), T=T_{up}, T_{dn} \quad (11d)$$

$$\text{Signal}_5^T = \text{SQRT}((1+[(V^{xx}(d_1)+V^{xx}(d_1))/(\tfrac{1}{2}V^{xx}(d_1)+\tfrac{1}{2}V^{yy}(d_1)+V^{zz}(d_1))]) \times (1+[(V^{xx}(d_2)+V^{xx}(d_2))/(\tfrac{1}{2}V^{xx}(d_2)+\tfrac{1}{2}V^{yy}(d_2)+V^{zz}(d_2))])), T=T_{up}, T_{dn} \quad (11e)$$

$V^{zz}$, $V^{xx}$, $V^{zz}$, $C^{xz}$, and $V^{zx}$ being coupling components, $d_1$ and $d_2$ being separation distances of the symmetric sensor tool.

At 1040, an inversion operation is performed using the set of compensated signals to determine one or more formation parameters. Performing the inversion operation can include performing 0D inversion. Results from the 0D inversion can be used to construct an initial formation model in higher-order dimensional inversion. Using the set of compensated signals to determine one or more formation parameters can include, but is not limited to, determining formation vertical resistivity or a ratio of formation vertical resistivity to formation horizontal resistivity. Using the set of compensated signals to determine one or more formation parameters can include determining formation parameters in a formation having multiple layers.

Figure 11:
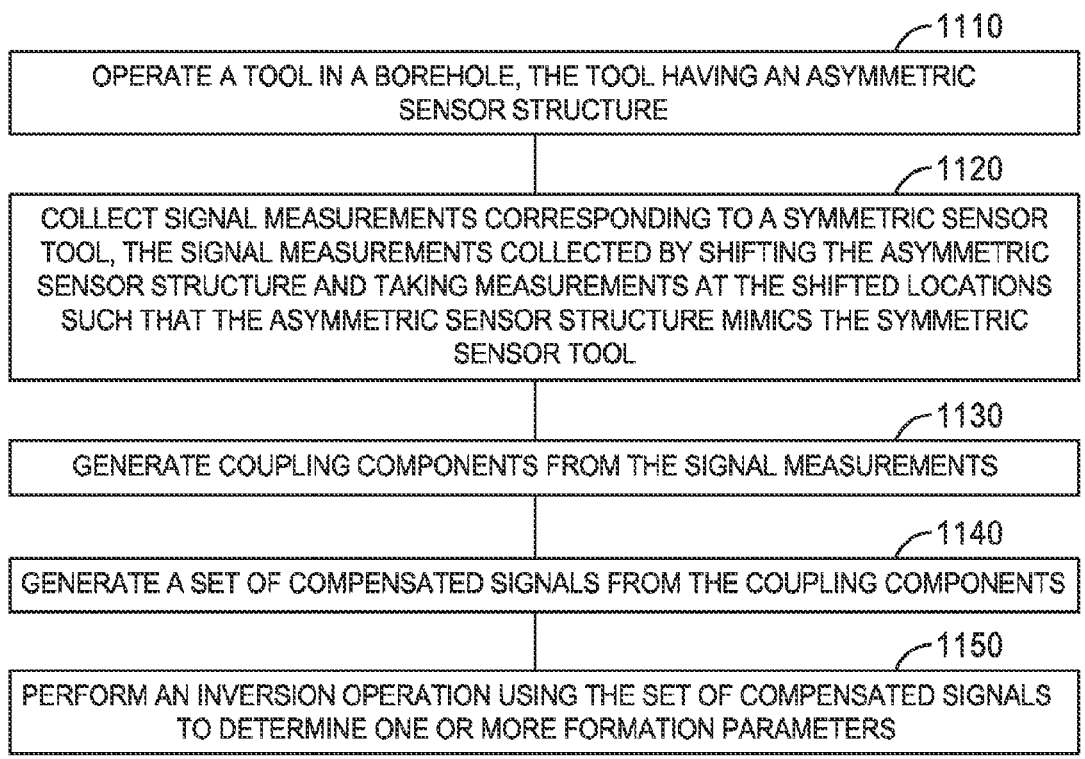
FIG. 11 shows features of an example method of determining formation parameters using compensated signals, in accordance with various embodiments.

FIG. 11 shows features of an example embodiment of a method of determining formation parameters using compensated signals. At 1110, a tool is operated in a borehole, the tool having an asymmetric sensor structure. At 1120, measurements corresponding to a symmetric sensor tool are collected signal, the signal measurements collected by shifting the asymmetric sensor structure and taking measurements at the shifted locations such that the asymmetric sensor structure mimics the symmetric sensor too. These signal measurements may provide decoupling of ZZ, XZ, ZX, and XX coupling components of a relationship between transmitted signals and received signals relative to a formation. At 1130, the coupling components are generated from the signal measurements.

At 1140, a set of compensated signals are generated from the coupling components. Generating the set of compensated signals can include generating $$\text{Signal}_{ij}^{Comp} = \sqrt{V_{T1-R1R2R3R4}^{ij} \times V_{T2-R1R2R3R4}^{ij}}, \quad (12)$$

where i and j indicate different coupling components, $R_1$, $R_2$, $R_3$, and $R_4$ correspond to mimicked receivers in shifting the asymmetric sensor structure, $V_{T1-R1R2R3R4}^{ij}$ is a coupling component derived from receiving a signal in each of mimicked antenna receivers $R_1$, $R_2$, $R_3$, and $R_4$ in response to firing antenna transmitter $T_1$, and $V_{T2-R1R2R3R4}^{ij}$ is a coupling component derived from receiving a signal in each of mimicked antenna receivers $R_1$, $R_2$, $R_3$, and $R_4$ in response to firing antenna transmitter $T_2$.

Generating the set of compensated signals from the coupling components can include generating compensated signals as $$\text{Signal}_i^{Comp} = \sqrt{\text{Signal}_i^{Tup} \times \text{Signal}_i^{Tdn}}; i=1, 2, 3, 4, \text{or } 5, \quad (13)$$

with $T_{up}$ being an upper tilted sensor of the asymmetric antenna and $\text{Signal}_i^{Tup}$ based on coupling components generated with respect to firing the upper tilted sensor, and $T_{dn}$ being a lower tilted sensor of the asymmetric antenna and $\text{Signal}_i^{Tdn}$ based on coupling components generated with respect to firing the lower tilted sensor. Generating $\text{Signal}_i^{Tup}$ and $\text{Signal}_i^{Tdn}$ can include generating, for $T_{up}$ and $T_{dn}$, one or more of $$\text{Signal}_1^T = V^{zz}(d_1)/V^{zz}(d_2), T=T_{up}, T_{dn}, \quad (14a)$$

$$\text{Signal}_2^T = \text{SQRT}(V^{xx}(d_1)/V^{zz}(d_1) \times V^{xx}(d_2)/V^{zz}(d_2)), T=T_{up}, T_{dn} \quad (14b)$$

$$\text{Signal}_3^T = \text{SQRT}(V^{yy}(d_1)/V^{zz}(d_1) \times V^{yy}(d_2)/V^{zz}(d_2)), T=T_{up}, T_{dn} \quad (14c)$$

$$\text{Signal}_4^T = \text{SQRT}(V^{xx}(d_1)/V^{yy}(d_1) \times V^{xx}(d_2)/V^{yy}(d_2)), T=T_{up}, T_{dn} \quad (14d)$$

$$\text{Signal}_5^T = \text{SQRT}((1+[(V^{xx}(d_1)+V^{xx}(d_1))/(\tfrac{1}{2}V^{xx}(d_1)+\tfrac{1}{2}V^{yy}(d_1)+V^{zz}(d_1))]) \times (1+[(V^{xx}(d_2)+V^{xx}(d_2))/(\tfrac{1}{2}V^{xx}(d_2)+\tfrac{1}{2}V^{yy}(d_2)+V^{zz}(d_2))])), T=T_{up}, T_{dn} \quad (14e)$$

$V^{zz}$, $V^{xx}$, $V^{zz}$, $V^{xz}$, and $V^{zx}$ being coupling components, $d_1$ and $d_2$ being separation distances of the mimicked symmetric sensor tool.

At 1150, an inversion operation is performed using the set of compensated signals to determine one or more formation parameters. Performing the inversion operation can include performing 0D inversion. Using the set of compensated signals to determine one or more formation parameters can include, but is not limited to, determining formation vertical resistivity or a ratio of formation vertical resistivity to formation horizontal resistivity.

Various components of a measurement system including a tool, having a plurality of sensors titled with respect to a longitudinal axis of the tool to operate as a symmetrical tool structure, and having a processing unit, which can generate compensated signals to determine, from received measurement signals, formation parameters with respect to the borehole in which the tool is operating, as described herein or in a similar manner, can be realized in combinations of hardware and software-based implementations. These implementations may include a machine-readable device having machine-executable instructions, such as a computer-readable storage medium having computer-executable instructions, for operating the system to control activation of sensors of the tool disposed in a borehole, to generate compensation signals from coupling components, and to perform inversion analysis to determine formation parameters according to any of the methods taught herein. In various embodiments, a machine-readable storage device can have instructions stored thereon, which, when executed by one or more processors of a machine, cause the machine to perform operations, the operations comprising any of the features of methods of presenting information regarding a formation and conducting operations based on the information in a manner identical to or similar to the methods and schemes described herein. The instructions can include generating sets of compensated signals from which formation parameters may be determined. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

In various embodiments, an apparatus to measure foil nation parameters can comprise a tool structure having a symmetric arrangement of transmitters and receivers along a longitudinal axis of the tool; a control unit to control activation of the transmitters of the tool structure; and a data processing unit to process signals received from the receivers in the tool structure in accordance with processes similar or identical to methods disclosed herein. In various embodiments, an apparatus to measure formation parameters can include a tool structure having an asymmetric arrangement of transmitters and receivers along a longitudinal axis of the tool; a control unit to control activation of the transmitters of the tool structure to mimic a symmetric arrangement of transmitters and receivers; and a data processing unit to process signals received from the receivers and transmitters in the tool structure in accordance with processes similar or identical to methods disclosed herein.

Figure 12:
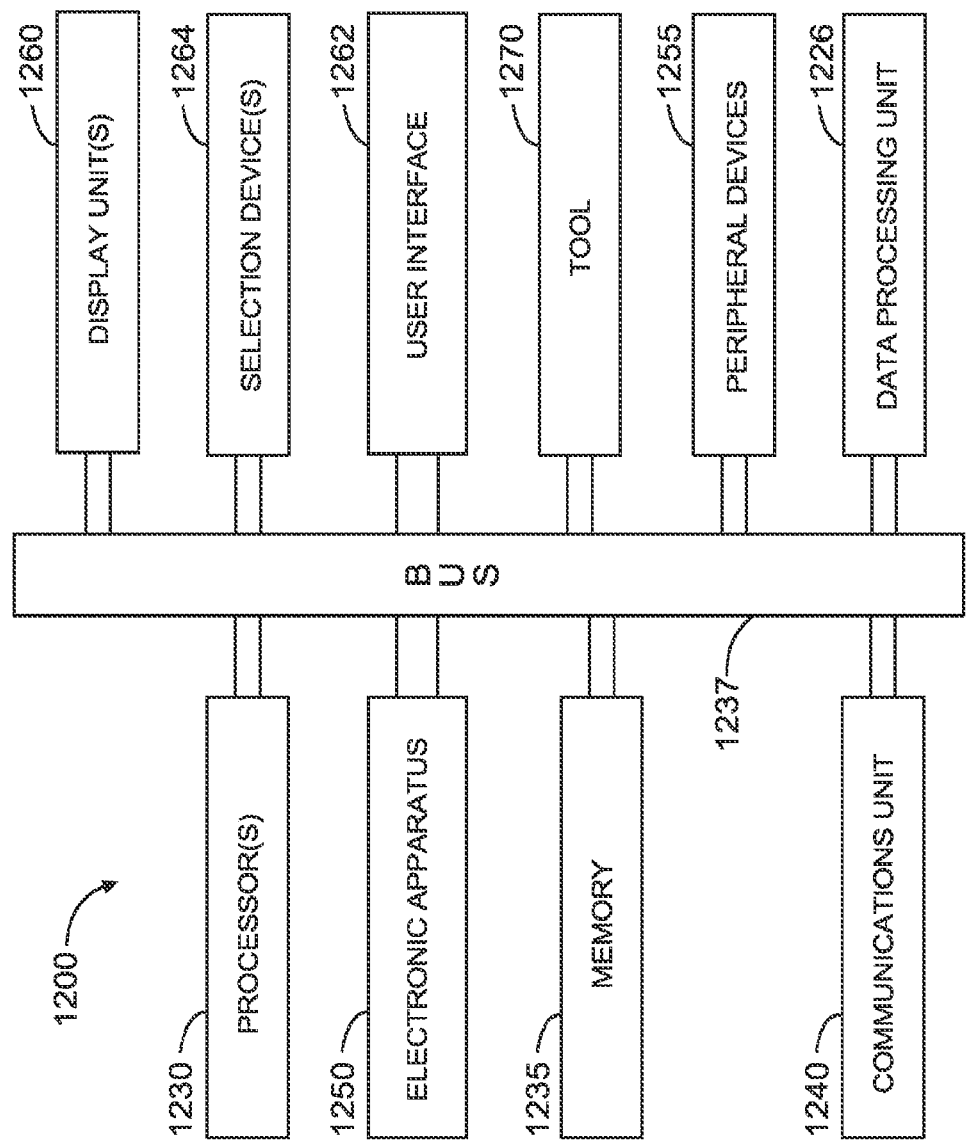
FIG. 12 depicts a block diagram of features of an example system having a tool configured to provide structural compensation to determination of formation parameters, in accordance with various embodiments.

FIG. 12 depicts a block diagram of features of an embodiment of an example system 1200 operable to execute schemes associated with generating compensation signals based on measurements made by a symmetric antenna tool or a mimicked symmetric antenna tool. System 1200 can include one or more processors 1230 and a data processing unit 1226, where the one or more processors 1230 and the data processing unit 1226 are structured to be operated according to any scheme similar to or identical to the schemes associated with collecting data as measurements corresponding to a symmetric antenna structure, generating compensated signals from the data, and using the compensation signals to determine formation parameters as taught herein. In an embodiment, processor(s) 1230 can be realized as a single processor or a group of processors that may operate independently depending on an assigned function. System 1200 can be arranged to perform various operations on the data, acquired from a tool 1270 operational downhole to make measurements with respect to formations, in a manner similar or identical to any of the processing techniques discussed herein.

System 1200 can be arranged as a distributed system and can include components in addition to the one or more processors 1230 and the data processing unit 1226. System 1200 can include a tool 1270 having transmitting sensors and receiving sensors arranged as a symmetrical antenna tool. Tool 1270 may also include an asymmetric antenna tool operable to mimic a symmetrical antenna tool.

System 1200 can include a memory 1235, an electronic apparatus 1250, and a communications unit 1240. The processor(s) 1230, the memory 1235, and the communications unit 1240 can be arranged to operate as a processing unit to control management of tool 1270 and to perform operations on data signals collected by tool 1270. The memory 1235 can include a database having information and other data such that the system 1200 can operate on data from tool 1270 in a post-processing manner in addition to operating on such data in real-time. In an embodiment, data processing unit 1226 can be distributed among the components of system 1200 including electronic apparatus 1250.

The communications unit 1240 can include downhole communications for communication to the surface at a well from the tool 1270. Such downhole communications can include a telemetry system. The communications unit 1240 may use combinations of wired communication technologies and wireless technologies at frequencies that do not interfere with on-going measurements. The communications unit 1240 can allow for a portion or all of the data analysis to be conducted downhole with results provided to a user interface 1262 for presentation on one or more display unit(s) 1260 aboveground. However, the communications unit 1240 can provide for data to be sent aboveground such that substantially all analysis is preformed aboveground. The communications unit 1240 can allow for transmission of commands to tool 1270 or drilling control downhole in response to signals provided by a user through the user interface 1262, which allows interactive control of a drilling operation. For instance, system 1200 can be realized having geosteering capabilities.

The system 1200 can also include a bus 1237, where the bus 1237 provides electrical conductivity among the components of the system 1200. The bus 1237 can include an address bus, a data bus, and a control bus, each independently configured. The bus 1237 can be realized using a number of different communication mediums that allows for the distribution of components of system 1200. Use of the bus 1237 can be regulated by the processor(s) 1230. The bus 1237 can include a network to transmit and receive signals including data signals and command and control signals.

In various embodiments, peripheral devices 1255 can include additional storage memory and/or other control devices that may operate in conjunction with the processor(s) 1230 and/or the memory 1235. The display unit(s) 1260 can be arranged with a screen display, as a distributed component on the surface, that can be used with instructions stored in the memory 1235 to implement the user interface 1262 to manage the operation of tool 1270 and/or components distributed within system 1200. Such a user interface can be operated in conjunction with the communications unit 1240 and the bus 1237. The display unit(s) 1260 can include a video screen, a printing device, or other structure to visually project information. The system 1200 can include a number of selection devices 1264 operable with the user interface 1262 to provide user inputs to operate the data processing unit 1226 or its equivalent. The selection device(s) 1264 can include one or more of a touch screen or a computer mouse operable with user interface 1262 to provide user inputs to operate the data processing unit.

The system 1200 can be compatible with a logging while drilling operation. The system 1200 can be also compatible with a wireline operation. The system 1200 can be arranged as a distributed system for a land-based drilling operation, a sea-based drilling operation, or a drilling operation having land-based and sea-based components.

Figure 13:
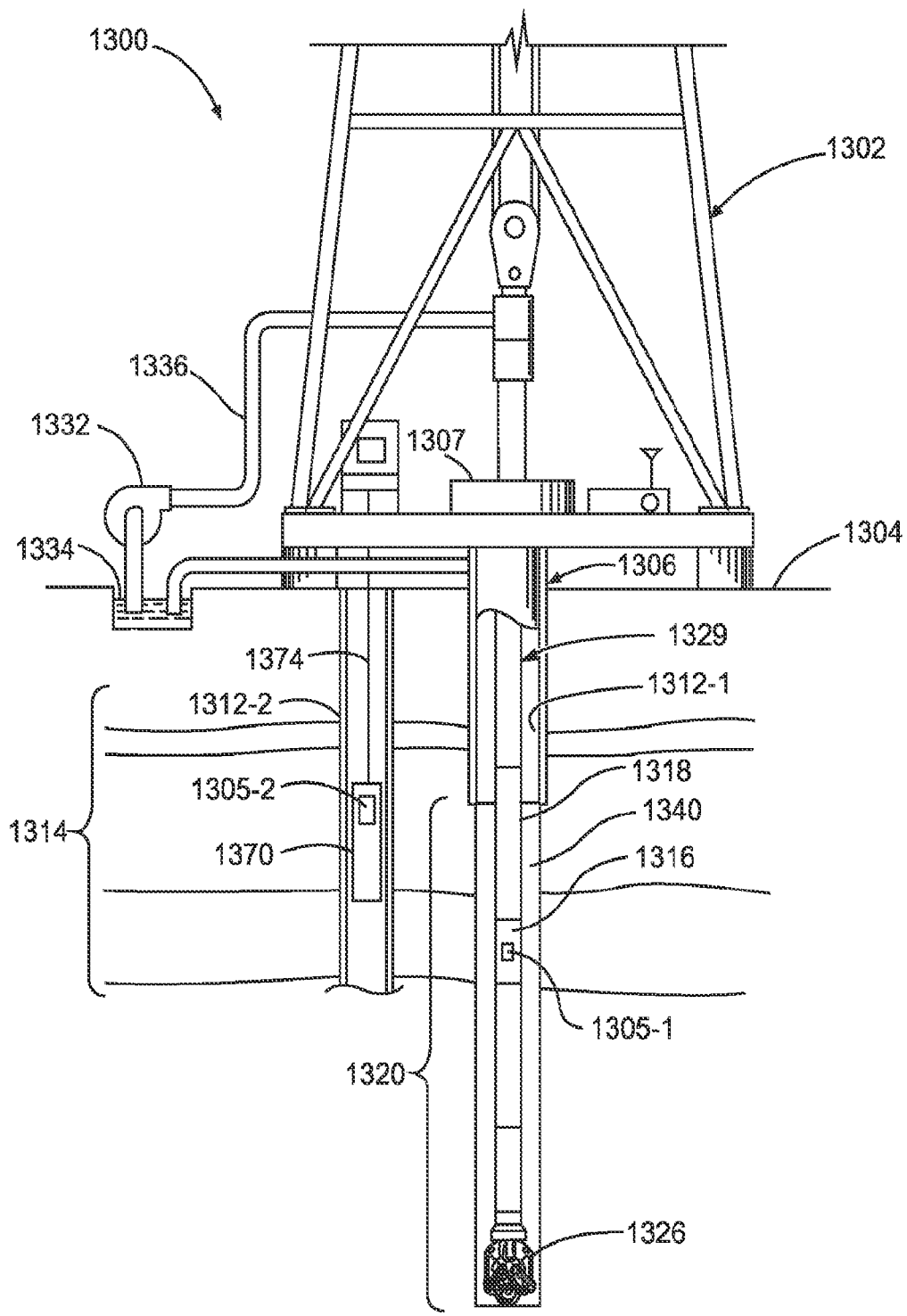
FIG. 13 depicts an embodiment of a system at a drilling site, where the system includes a tool configured to provide structural compensation to determination of formation parameters, in accordance with various embodiments.

FIG. 13 depicts an example embodiment of a system 1300 at a drilling site, where the system is operable to generate compensation signals based on measurements made by a symmetric antenna tool or a mimicked symmetric antenna tool and operate on the compensated signals to determine formation parameters. The system 1300 can include a tool 1305-1, 1305-2, or both 1305-1 and 1305-2 to conduct generation of compensation signals and determination of formation parameters as taught herein. Tools 1305-1 and 1305-2 can be realized in a similar or identical manner to arrangements taught herein to conduct the processing of compensation signals.

System 1300 can include a drilling rig 1302 located at a surface 1304 of a well 1306 and a string of drill pipes, that is, drill string 1329, connected together so as to form a drilling string that is lowered through a rotary table 1307 into a wellbore or borehole 1312-1. Drilling rig 1302 can provide support for drill string 1329. Drill string 1329 can operate to penetrate rotary table 1307 for drilling the borehole 1312-1 through subsurface formations 1314. Drill string 1329 can include drill pipe 1318 and a bottom hole assembly 1320 located at the lower portion of drill pipe 1318.

The bottom hole assembly 1320 can include a drill collar 1316 and a drill bit 1326. Drill bit 1326 can operate to create borehole 1312-1 by penetrating the surface 1304 and the subsurface formations 1314. Bottom hole assembly 1320 can include tool 1305-1 attached to drill collar 1316 to conduct measurements using a symmetric antenna tool or mimicked symmetric antenna tool to process compensation signals to determine formation parameters. Tool 1305-1 can be structured for an implementation in a MWD system such as a LWD system. The housing containing tool 1305-1 can include electronics to activate a symmetric antenna structure or a structure to mimic a symmetric antenna structure of tool 1305-1 to collect measurement signals. Such electronics can include a data processing unit to generate compensated signals from coupling components and to provide analysis of foil nation parameters over a standard communication mechanism for operating in a well. Alternatively, electronics can include a communications interface to provide measurement signals collected by tool 1305-1 to the surface over a standard communication mechanism for operating in a well, where these measurements signals can be analyzed at a data processing unit at the surface to generate compensated signals from coupling components and to provide analysis of formation parameters.

During drilling operations, drill string 1329 can be rotated by rotary table 1307. In addition to, or alternatively, the bottom hole assembly 1320 can also be rotated by a motor (e.g., a mud motor) that is located downhole. Drill collars 1316 can be used to add weight to drill bit 1326. Drill collars 1316 also can stiffen the bottom hole assembly 1320 to allow the bottom hole assembly 1320 to transfer the added weight to drill bit 1326, and in turn, assist drill bit 1326 in penetrating surface 1304 and subsurface formations 1314.

During drilling operations, a mud pump 1332 can pump drilling fluid (sometimes known by those of skill in the art as "drilling mud") from a mud pit 1334 through a hose 1336 into drill pipe 1318 and down to drill bit 1326. The drilling fluid can flow out from drill bit 1326 and be returned to the surface 1304 through an annular area 1340 between drill pipe 1318 and the sides of the borehole 1312-1. The drilling fluid may then be returned to mud pit 1334, where such fluid is filtered. In some embodiments, the drilling fluid can be used to cool drill bit 1326, as well as to provide lubrication for drill bit 1326 during drilling operations. Additionally, the drilling fluid may be used to remove subsurface formation 1314 cuttings created by operating drill bit 1326.

In various embodiments, tool 1305-2 may be included in a tool body 1370 coupled to a logging cable 1374 such as, for example, for wireline applications. The tool body 1370 containing the tool 1305-2 can include electronics to activate a symmetric antenna structure or a structure to mimic a symmetric antenna structure of tool 1305-2 to collect measurement signals. Such electronics can include a data processing unit to generate compensated signals from coupling components and to provide analysis of formation parameters over a standard communication mechanism for operating in a well. Alternatively, electronics can include a communications interface to provide measurement signals collected by tool 1305-1 to the surface over a standard communication mechanism for operating in a well, where these measurements signals can be analyzed at a data processing unit at the surface to generate compensated signals from coupling components and to provide analysis of formation parameters. The logging cable 1374 may be realized as a wireline (multiple power and communication lines), a mono-cable (a single conductor), and/or a slick-line (no conductors for power or communications), or other appropriate structure for use in the borehole 1312.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   making signal measurements using a symmetric sensor tool, wherein the symmetric sensor tool includes a tool structure on which an upper crossed sensor structure, a lower crossed sensor structure, an upper tilted sensor, and a lower tilted sensor are disposed in a symmetric arrangement with respect to a longitudinal axis of the tool structure such that the upper crossed sensor structure and the upper tilted sensor are spaced apart by a distance at which the lower crossed sensor structure and the lower tilted sensor are spaced apart, the upper crossed sensor structure formed by two co-located tilted sensors and the lower crossed sensor structure formed by two co-located tilted sensors;
   generating ZZ, XZ, ZX, and XX coupling components of a relationship between transmitted signals and received signals relative to a formation from the signal measurements;
   generating a set of compensated signals from the coupling components; and
   performing an inversion operation using the set of compensated signals to determine one or more formation parameters.

2. The method of claim 1, wherein the upper tilted sensor and the lower tilted sensor are tilted antenna transmitters and the upper crossed sensor structure and the lower crossed sensor structure are tilted receiver antennas with the upper crossed sensor structure and the lower crossed sensor structure disposed between the upper tilted sensor and the lower tilted sensor.

3. The method of claim 2, wherein making signal measurements includes firing the upper tilted sensor and collecting signals at each of the tilted antenna receivers of the upper crossed sensor structure in response to firing the upper tilted sensor and the lower crossed sensor structure, and firing the lower tilted sensor and collecting signals at each of the tilted antenna receivers of the upper crossed sensor structure and the lower crossed sensor structure in response to firing the upper tilted sensor and the lower crossed sensor structure.

4. The method of claim 2, wherein generating the set of compensated signals includes generating $$\text{Signal}_{ij}^{Comp} = \sqrt{V_{T1-R1R2R3R4}^{ij} \times V_{T2-R1R2R3R4}^{ij}},$$

where i and j indicate different coupling components, $V_{T1-R1R2R3R4}^{ij}$ is a coupling component derived from receiving a signal in each of antenna receivers $R_1$, $R_2$, $R_3$, $R_4$, in response to firing antenna transmitter $T_1$, and $V_{T2-R1R2R3R4}^{ij}$ is a coupling component derived from receiving a signal in each of antenna receivers $R_1$, $R_2$, $R_3$, $R_4$ in response to firing antenna transmitter $T_2$, antenna transmitter $T_1$ being the upper tilted sensor, antenna transmitter $T_2$ being the lower tilted sensor, $R_1$ and $R_2$ forming the upper crossed sensor structure, $R_3$ and $R_4$ forming the lower crossed sensor structure.

5. The method of claim 1, wherein generating the set of compensated signals from the coupling components includes generating compensated signals as $$\text{Signal}_i^{Comp} = \sqrt{\text{Signal}_i^{Tup} \times \text{Signal}_i^{Tdn}}; i=1, 2, 3, 4, \text{ or } 5,$$

with $T_{up}$ being the upper tilted sensor and $\text{Signal}_i^{Tup}$ based on coupling components generated with respect to firing the upper tilted sensor, and $T_{dn}$ being the lower tilted sensor and $\text{Signal}_i^{Tdn}$ based on coupling components generated with respect to firing the lower tilted sensor.

6. The method of claim 5, wherein generating $\text{Signal}_i^{Tup}$ and $\text{Signal}_i^{Tdn}$ includes generating, for $T_{up}$ and $T_{dn}$, one or more of $\text{Signal}_1^T = V^{zz}(d_1)/V^{zz}(d_2)$, $\quad T=T_{up}, T_{dn}$ $\text{Signal}_2^T = \text{SQRT}(V^{xx}(d_1)/V^{zz}(d_1) \times V^{xx}(d_2)/V^{zz}(d_2))$, $\quad T=T_{up}, T_{dn}$ $\text{Signal}_3^T = \text{SQRT}(V^{yy}(d_1)/V^{zz}(d_1) \times V^{yy}(d_2)/V^{zz}(d_2))$, $\quad T=T_{up}, T_{dn}$ $\text{Signal}_4^T = \text{SQRT}(V^{xx}(d_1)/V^{yy}(d_1) \times V^{xx}(d_2)/V^{yy}(d_2))$, $\quad T=T_{up}, T_{dn}$ $\text{Signal}_5^T = \text{SQRT}((1+[(V^{xz}(d_1)+V^{zx}(d_1))/(½V^{xx}(d_1)+½V^{yy}(d_1)+V^{zz}(d_1))]) \times (1+[(V^{xz}(d_2)+V^{zx}(d_2))/(½V^{xx}(d_2)+½V^{yy}(d_2)+V^{zz}(d_2))]))$, $\quad T=T_{up}, T_{dn}$, $V^{zz}$, $V^{xx}$, $V^{zz}$, $V^{xz}$, and $V^{zx}$ being coupling components, $d_1$ and $d_2$ being separation distances of the symmetric sensor tool.

7. The method of claim 1, wherein the upper tilted sensor and the lower tilted sensor are tilted antenna receivers and the upper crossed sensor structure and the lower crossed sensor structure are tilted transmitter antennas with the upper tilted sensor and the lower tilted sensor disposed between the upper crossed sensor structure and the lower crossed sensor structure.

8. The method of claim 1, wherein performing the inversion operation includes performing zero dimension inversion.

9. The method of claim 8, wherein the method includes using results from the zero dimension inversion to construct an initial formation model in higher-order dimensional inversion.

10. The method of claim 1, wherein the method includes determining formation vertical resistivity or a ratio of formation vertical resistivity to formation horizontal resistivity.

11. The method of claim 1, wherein the method includes determining formation parameters in a formation having multiple layers.

12. A method comprising:
operating a tool in a borehole, the tool having an asymmetric sensor structure;
making signal measurements, using the asymmetric sensor structure, corresponding to a symmetric sensor tool, the signal measurements collected by shifting the asymmetric sensor structure and taking measurements at the shifted locations such that the asymmetric sensor structure mimics the symmetric sensor tool;
generating ZZ, XZ, ZX, and XX coupling components of a relationship between transmitted signals and received signals relative to a formation from the signal measurements;
generating a set of compensated signals from the coupling components including generating compensated signals as $$\text{Signal}_i^{Comp} = \sqrt{\text{Signal}_i^{Tup} \times \text{Signal}_i^{Tdn}}; i=1, 2, 3, 4, \text{ or } 5,$$

with $T_{up}$ being an upper tilted sensor of an asymmetric antenna and $\text{Signal}_i^{Tup}$ based on coupling components generated with respect to firing the upper tilted sensor, and $T_{dn}$ being a lower tilted sensor of the asymmetric antenna and $\text{Signal}_i^{Tdn}$ n based on coupling components generated with respect to firing the lower tilted sensor; and
performing an inversion operation using the set of compensated signals to determine one or more formation parameters.

13. The method of claim 12, wherein generating the set of compensated signals includes generating $$\text{Signal}_{ij}^{Comp} = \sqrt{V_{T1-R1R2R3R4}^{ij} \times V_{T2-R1R2R3R4}^{ij}},$$

where i and j indicate different coupling components, $R_1$, $R_2$, $R_3$, and $R_4$ correspond to mimicked receivers in shifting the asymmetric sensor structure, $V_{T1-R1R2R3R4}^{ij}$ is a coupling component derived from receiving a signal in each of mimicked antenna receivers $R_1$, $R_2$, $R_3$, and $R_4$ in response to firing antenna transmitter $T_1$, and $V_{T2-R1R2R3R4}^{ij}$ is a coupling component derived from receiving a signal in each of mimicked antenna receivers $R_1$, $R_2$, $R_3$, and $R_4$ in response to firing antenna transmitter $T_2$.

14. The method of claim 12, wherein generating $\text{Signal}_i^{Tup}$ and $\text{Signal}_i^{Tdn}$ includes generating, for $T_{up}$ and $T_{dn}$, one or more of, $\text{Signal}_1^T = V^{zz}(d_1)/V^{zz}(d_2)$, $\quad T=T_{up}, T_{dn}$ $\text{Signal}_2^T = \text{SQRT}(V^{xx}(d_1)/V^{zz}(d_1) \times V^{xx}(d_2)/V^{zz}(d_2))$, $\quad T=T_{up}, T_{dn}$ $\text{Signal}_3^T = \text{SQRT}(V^{yy}(d_1)/V^{zz}(d_1) \times V^{yy}(d_2)/V^{zz}(d_2))$, $\quad T=T_{up}, T_{dn}$ $\text{Signal}_4^T = \text{SQRT}(V^{xx}(d_1)/V^{yy}(d_1) \times V^{xx}(d_2)/V^{yy}(d_2))$, $\quad T=T_{up}, T_{dn}$ $\text{Signal}_5^T = \text{SQRT}((1+[(V^{xz}(d_1)+V^{zx}(d_1))/(½V^{xx}(d_1)+½V^{yy}(d_1)+V^{zz}(d_1))]) \times (1+[(V^{xz}(d_2)+V^{zx}(d_2))/(½V^{xx}(d_2)+½V^{yy}(d_2)+V^{zz}(d_2))]))$, $\quad T=T_{up}, T_{dn}$, $V^{zz}$, $V^{xx}$, $V^{zz}$, $V^{xz}$, and $V^{zx}$ being coupling components, $d_1$ and $d_2$ being separation distances of the symmetric sensor tool.

15. The method of claim 12, wherein performing the inversion operation includes performing zero dimension inversion.

16. The method of claim 12, wherein the method includes determining formation vertical resistivity or a ratio of formation vertical resistivity to formation horizontal resistivity.

* * * * *